United States Patent [19]

Kinch, Jr. et al.

[11] 4,166,922

[45] Sep. 4, 1979

[54] MULTI-MODE DIGITAL ENCIPHERING SYSTEM WITH REPEATED PRIMING SEQUENCES

[75] Inventors: Frederick A. Kinch, Jr., Richardson; Barrie O. Morgan, Dallas, both of Tex.

[73] Assignee: Datotek, Inc., Dallas, Tex.

[21] Appl. No.: 832,068

[22] Filed: Sep. 9, 1977

Related U.S. Application Data

[62] Division of Ser. No. 568,096, Apr. 14, 1975, Pat. No. 4,079,188.

[51] Int. Cl.² .............................................. H04L 9/00
[52] U.S. Cl. ..................................... 178/22; 178/69.1
[58] Field of Search ................... 178/22, 69.1; 364/728

[56] References Cited

U.S. PATENT DOCUMENTS

| | | | |
|---|---|---|---|
| 3,317,669 | 5/1967 | Ohnsorge | 178/69.1 |
| 3,781,473 | 12/1973 | Goode et al. | 178/22 |
| 3,808,365 | 4/1974 | Ehrat | 178/22 |
| 3,866,217 | 2/1975 | Bennett, Jr. | 178/22 |
| 3,936,601 | 2/1976 | Obeginski | 178/22 |
| 4,013,837 | 3/1977 | Branscome | 178/22 |

*Primary Examiner*—Howard A. Birmiel
*Attorney, Agent, or Firm*—Richards, Harris & Medlock

[57] ABSTRACT

The specification discloses an electronic digital enciphering system which is selectively operable in a plurality of different modes. The system may be operated in an off-line mode for preparing enciphered message tapes prior to transmission via teleprinter message circuits. The system may also be operated in an on-line asynchronous mode wherein a sending station may asynchronously transmit enciphered data on-line to a remote receiving unit, synchronization being provided by the start/stop pulses of the individual digital characters. The system may also be operated in an on-line synchronous mode wherein a sending and a receiving unit are automatically synchronized in time by local self-contained clocks in order to bridge fades or interference in a transmission medium such as radio telegraph, or the like. The system may be utilized on either half-duplex or full-duplex communication channels.

8 Claims, 21 Drawing Figures

MULTI-MODE DIGITAL ENCIPHERING SYSTEM WITH REPEATED PRIMING SEQUENCES

This is a division of application Ser. No. 568,096 filed Apr. 14, 1975 now U.S. Pat. No. 4,079,188.

FIELD OF THE INVENTION

This invention relates to digital encryption, and more particularly relates to electronic apparatus for automatically enciphering and deciphering digital data.

THE PRIOR ART

Electronic systems for automatically enciphering and deciphering digital data have been heretofore developed. Such prior systems have included "off-line" systems wherein a punched tape or the like is enciphered and then transmitted to a remote location for deciphering. An example of such an "off-line" system is described in U.S. Pat. No. 3,781,472, entitled "DIGITAL DATA CIPHERING TECHNIQUE" issued Dec. 25, 1973, and assigned to the present assignee.

Another type of electronic enciphering device is known as an "on-line" system and may be utilized to automatically encipher and decipher digital data being input on a real-time basis through an input terminal such as a teleprinter or the like. On-line operation may be conducted either asynchronously, wherein the synchronization between the transmitting and receiving unit is maintained on a character by character basis, or in the synchronous mode, wherein the transmitting and receiving units are independently maintained in synchronization by independent clocks. An example of an electronic system which may be operated in either an off-line mode or in the asynchronous on-line mode is disclosed in U.S. patent application Ser. No. 299,387, filed Oct. 20, 1972, and entitled "DIGITAL CRYPTOGRAPHIC SYSTEM AND METHOD" and assigned to applicant.

Although the previously developed electronic encryption systems have worked well in practice, the prior systems have often been limited to one or two operating modes, and to operation with a particular digital character set. Moreover, prior encryption systems adapted for operation in the on-line synchronous mode with a full duplex communications channel have required resynchronization of the system where it was desired to reverse the direction of data transmission.

A need has thus arisen for an improved electronic encryption system which is selectively operable in the off-line mode, the on-line asynchronous mode or the on-line synchronous mode. Moreover, a need has risen for a multi-mode digital encryption system which is operable with a variety of character sets, at a variety of baud rates and with a variety of input and output devices and over a variety of communications lines.

Prior enciphering systems have generally utilized conventional modulo-2 addition of plain text with a pseudo-random key stream to provide encryption. In addition, other techniques have been developed wherein a plain text digital word is loaded into a binary counter which is then clocked for a number of steps determined by a randomized digitial key word. An example of such encoding circuitry is described in U.S. Pat. No. 3,781,472, issued Dec. 25, 1973, and entitled "DIGITAL DATA CIPHERING TECHNIQUE", and assigned to the present assignee. Such previously developed enciphering techniques have generally worked well, but require a substantial amount of circuitry and time to accomplish the required clocking steps. A need has thus arisen for an enciphering technique which may be accomplished with a minimum of circuitry and at a high speed, while providing maximum security.

SUMMARY OF THE INVENTION

In accordance with the present invention, an electronic digital encryption system is provided which substantially eliminates and reduces the problems and inadequacies found in devices heretofore developed. The present invention provides a multi-purpose digital enciphering system for selective operation of an off-line mode, an asynchronous on-line mode or in a synchronous on-line mode.

In accordance with a more specific aspect of the invention, a multi-purpose digital cipher system is provided for use with a teleprinter having a keyboard and a printer. A keyboard synchronizer is operable in an asynchronous mode to clock in digital characters input from the keyboard. Circuitry enciphers the digital character clocked in by the keyboard synchronizer. An output synchronizer is operable in either an asynchronous or a synchronous mode for outputting enciphered digital characters from the enciphering circuit. An off-line switch may be operated to interconnect the output synchronizer in an asynchronous mode such that the enciphered digital characters are asynchronously shifted to the printer. An asynchronous on-line switch may be operated to interconnect the output synchronizer in an asynchronous mode such that the enciphered digital characters are asynchronously shifted to a communications channel. A synchronous on-line switch may be operated to interconnect the output synchronizer in a free-running synchronous mode such that the enciphered digital characters are synchronously shifted to a communications channel.

In accordance with another aspect of the invention, a synchronous on-line digital cipher system includes a first cipher unit having a first frame sync generator for transmitting a prescribed sequence of digital synchronization patterns. A second cipher unit is provided to receive the sequence and includes a correlation circuit for detecting a predetermined number of the digital synchronization patterns within a set time interval in order to generate a sync signal to synchronize the second cipher unit to the first cipher unit. Circuitry in the second cipher unit is operable upon generation of the sync signal for retransmitting the prescribed sequence of digital synchronization patterns to the first cipher unit. Circuitry in the first cipher unit is responsive to the prescribed sequence for synchronizing the first cipher unit to the second cipher unit. Thus, ciphered data may be transmitted synchronously between the first and second cipher units in either direction.

In accordance with yet another aspect of the invention, correlation circuitry is provided to detect a predetermined digital synchronization pattern in a digital code system. The correlation circuitry includes circuitry for receiving a digital pattern. Circuitry detects the number of a predetermined logic level contained in the digital synchronization pattern. A threshold detector is responsive to the detecting circuitry for generating an output threshold signal if the number of a predetermined logic level is greater than a predetermined number, but less than the previously detected number. Circuitry is responsive to the output signal for generating a peak signal to indicate the reception of the predetermined digital synchronization pattern.

In accordance with another aspect of the invention, synchronization circuitry for a digital code system includes circuitry for generating output signals upon the occurrences of a predetermined digital pattern. Circuitry detects the output signals during prescribed time windows. Circuitry counts the number of output signals detected during a predetermined time interval. Circuitry is responsive to the counting circuitry for generating a synchronization signal to initiate synchronization of the digital code system.

In accordance with another aspect of the invention, prime circuitry for a digital cipher system includes a key generator for generating a plurality of random digital prime bits. Circuitry transmits the prime bits to a remote cipher unit and simultaneously to a storage unit. Circuitry accesses the storage unit for transmitting the prime bits a predetermined additional number of times to insure correct reception of prime by the remote cipher unit. At the remote unit, the received digital prime bits are stored and are subsequently accessed according to a predetermined algorithm in order to determine a single prime word.

In accordance with another aspect of the invention, a code system for digital data representing a set of characters includes circuitry for receiving a first digital word representative of one of the characters. Circuitry randomly generates a digital key word from a predetermined set of digital key words. A read only memory stores digital representations of all of the characters grouped in addressable subsets according to the generated first digital word and the generated digital key word. Circuitry is responsive to the first digital word and the digital key word for generating an address representative of one of the digital representations stored in the read only memory. Circuitry detects the addressed one of the digital representations. Buffering circuitry is provided to selectively buffer the addressed one of the digital representations when the system is operating in a synchronous mode. Circuitry is also provided to selectively buffer the digital key word when the system is operated in a synchronous mode with a full duplex channel. Circuitry is also provided to operate as a digital phase lock loop in order to maintain the system in synchronization when operating in the synchronous mode.

DESCRIPTION OF THE DRAWINGS

For a more complete understanding of the present invention and for further objects and advantages thereof, reference is now made to the following description, taken in conjunction with the accompanying drawings, in which.

DESCRIPTION OF THE PREFERRED EMBODIMENT

Figure 1:
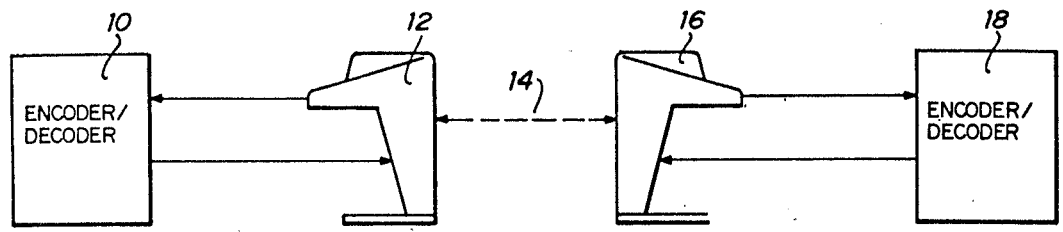
FIG. 1 is a somewhat diagrammatic illustration of the present system connected in the off-line mode.

Referring to FIG. 1, a block diagram of the present encryption device connected in an off-line mode is illustrated. The encryption system includes a first encoder/decoder unit 10 interconnected with a conventional teleprinter 12. Digital data may be transmitted from the teleprinter 12 through conventional teleprinter communication channel 14 to a remote teleprinter 16. A second encoder/decoder unit 18 in accordance with the present invention is connected off-line with the teleprinter 16.

In operation of the system shown in FIG. 1, it will be assumed that it is desired to encode a digital message at the teleprinter 12 and to transmit the enciphered message via the communications channel 14 to teleprinter 16. A clear or plain text (uncoded) punch tape is prepared on the teleprinter 12 in the conventional manner. The teleprinter 12 is placed in the LINE position and the tape punch is turned on. The encoder/decoder unit 10 is placed in the encoding mode and a second encoded tape is punched by reading the clear tape at full speed into the teleprinter 12. The encoded tape is then transmitted through the communications channel 14 to the remote station, or alternatively, may be physically handcarried to the remote teleprinter 16. To decode the cipher message, the ciper tape is placed in the teleprinter reader and the encoder/decoder unit 18 is properly set for decoding operation. The decoded message will then be printed out by the teleprinter 16. For a more detailed description of the operation of a system in the off-line mode, reference is made to the previously noted U.S. Pat. No. 3,781,472.

Figure 2:
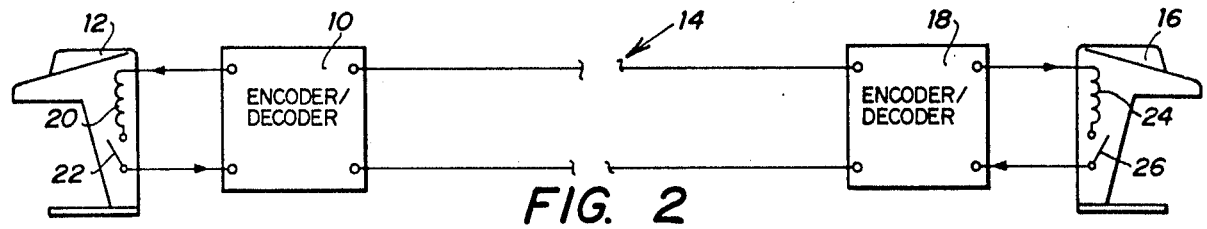
FIG. 2 is a somewhat diagrammatic illustration of the present system connected in an on-line half-duplex mode.

FIG. 2 illustrates the present encoder/decoder system connected in an on-line configuration. In this embodiment, the encoder-decoder unit 10 is connected between the teleprinter 12 and the teleprinter communications channel 14. Similarly, the encoder/decoder unit 18 is connected between the communications channel 14 and the teleprinter 16. The printer coil 20 is connected to receive data from the encoder/decoder, while the keyboard switch 22 is connected to generate digital data to the encoder/decoder. Similarly, the printer coil 24 of teleprinter 16 is operable to print out digital data received from the encoder/decoder 18, while the keyboard switch 26 is operable to generate digital data for transmission to the encoder/decoder 18. The system illustrated in FIG. 2 utilizes a two wire transmission channel and the teleprinters 12 and 16 are connected in a half-duplex mode. When the teleprinters are connected in half-duplex, off-line operation is not possible. However, the encoder/decoder units 10 and 18 may be operated in either the on-line asynchronous or on-line synchronous modes when configured as shown in FIG. 2.

In operation of the system shown in FIG. 2, clear or plain text (uncoded) digital data is entered through the keyboard of the teleprinter 12 and is applied to the encoder/decoder 10, whereupon it is enciphered. The enciphered digital data is applied through the communications channel 14 to the encoder/decoder 18, whereupon it is decoded. The decoded clear text digital data is then applied to the printer coil 24 and is printed out at the teleprinter 16. Upon proper reinitialization and synchronization of the systems, data may be transmitted from teleprinter 16 to teleprinter 12 in the same manner. Due to the enciphering of the digital data, unauthorized tapping of the communications channel 14 will result in an unintelligible garble of digital bits, thereby rendering the transmitted information secure.

Figure 3:
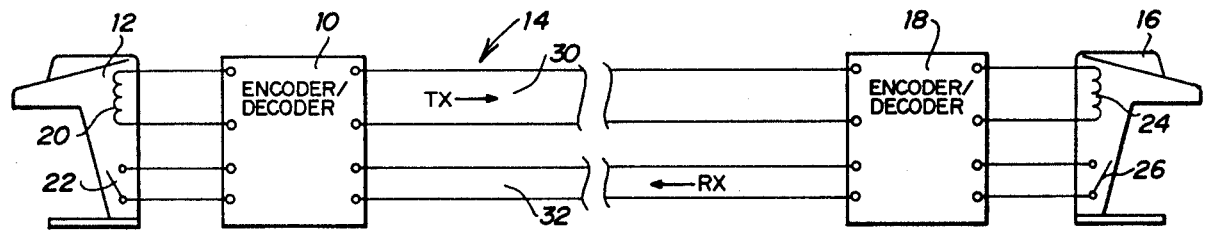
FIG. 3 is a somewhat diagrammatic illustration of the invention connected in an on-line full-duplex mode and operable in a synchronous manner.

FIG. 3 illustrates the enciphering system connected in a four line full-duplex system. The encoder/decoder 10 in this configuration is connected separately to the printer coil 20 and to the keyboard switch 22. The communications channel 14 comprises a two-wire pair 30 for transmitting data and a two wire pair 32 for receiving data. The encoder/decoder 18 is separately connected to the printing coil 24 and to the keyboard switch 26 of the printer 16. In this configuration, the system may be operated in either the synchronous or asynchronous modes.

In operation of the system shown in FIG. 3, clear text data is entered into the keyboard of the teleprinter 12 and the keyboard switch 22 transmits clear text digital data to the encoder/decoder 10, which enciphers the digital data. The enciphered digital data is transmitted via the wire pair 30 to the remote station. Any tapping of the wire pair 30 will result in an unintelligible digital garble, thereby rendering any transmitted data secure. The enciphered digital data is received by the encoder/decoder 18 and is decoded. The decoded digital data is applied to the printer coil 24, and the clear text is printed at the printer of teleprinter 16. When the system is operating with a full-duplex channel in the synchronous mode as shown in FIG. 3, data may be typed into the keyboard of teleprinter 16 at any time and transmitted to the printer of teleprinter 12, without the need for resynchronization of the system.

Figure 4:
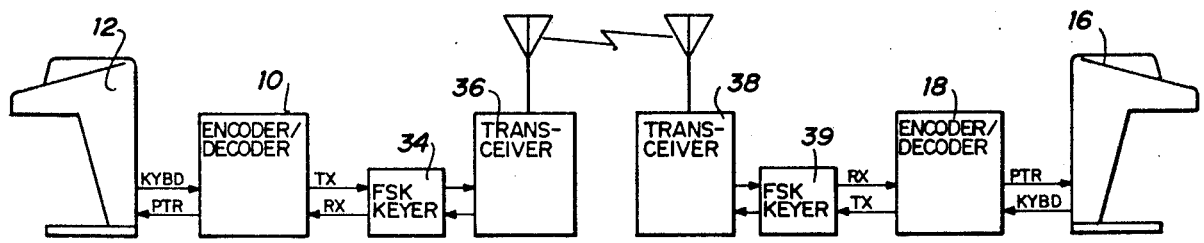
FIG. 4 is a somewhat diagrammatic illustration of the present invention connected in an on-line synchronous mode utilizing a radio telegraph communications system.

FIG. 4 illustrates the use of the present enciphering system in a radio telegraph communications channel. The teleprinter 12 may be connected in either the half-duplex or full-duplex mode to the encoder/decoder 10 in the manner previously described. The encoder/decoder 10 is connected to a frequency shift key (FSK) keyer 34 which converts telegraphic data into tones for transmission, and vice-versa. The tones are applied to a radio transceiver 36 which transmits radio waves to a remote transceiver 38. The output of transceiver 38 is applied through an FSK keyer 39 which generates digital data to the encoder/decoder 18. The encoder/decoder 18 is connected to the teleprinter 16 in either a half-duplex or full-duplex mode as previously described. With the configuration shown in FIG. 4, digital data may be encoded in the manner previously described and transmitted via the radio telegraph system in either the asynchronous mode or the synchronous mode.

The synchronous on-line mode is particulary designed for use with the system shown in FIG. 4, as the radio-telegraph system is susceptible to interference or fades and often has high error rates. The present enciphering system enables both systems to be synchronized and to individually maintain the synchronization by clocks at each location. Once synchronization is established, the two stations remain in synchronization independent of channel conditions. In the half-duplex radio channel mode, the encoder/decoder units must be reinitiated each time the traffic is reversed. However, if a full-duplex channel exists, this system has the capability of synchronizing themselves in both directions simultaneously. Once this is done, half-duplex traffic may be utilized without having to reinitiate each time the direction of traffic is reversed. If the system is used in either of the two on-line modes, the system will automatically switch from encipher to decipher upon the reversal of the traffic.

An important aspect of the present invention is that the present system has the capability of being interconnected in any of the configurations shown in FIGS. 1–4, merely by switching control switches and by correctly interconnecting the devices to the teleprinters and to the communication channels. The system may be utilized with single (neutral) or double (polar) currents, and with either an internally or externally supplied battery. The system has a plurality of selectable baud rates, and is operable with a five level Baudot (CCITT2) code, or the equivalent. The system may be utilized with a full character set (all 32 Baudot characters) or the Telex character set (29 characters) in the enciphered mode.

Figure 5:
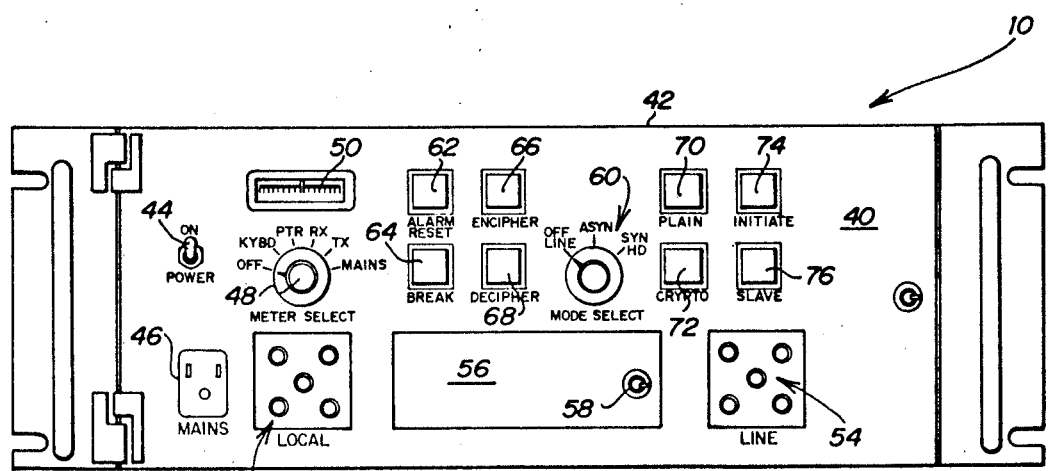
FIG. 5 is a front view of the control panel of the present system.

FIG. 5 illustrates a view of the front panel of the encoder/decoder unit 10, which is identical to the encoder/decoder 18. The front panel 40 is removably attached to a housing 42 which contains the circuitry of the invention. Front panel 40 is hinged to be opened in order to expose switches to enable selection of the desired code, as will be subsequently described.

A power on/off switch 44 may be operated to control the mains power to the system. Power is applied to the system by connection to the mains AC power receptacle 46. The unit is capable of handling nominal voltages from 100 to 260 volts AC (selectable) and from 50–60 Hz.

The meter select switch 48 is operable between five on positions in order to select one of five circuits for the meter 50 to monitor. Four of the circuits to be monitored are teletype loops and the fifth is the mains voltage. While monitoring one of the teletype loops, a MARK is indicated by deflection of the needle to the right. A SPACE is indicated by no deflection in the case of neutral current or deflection to the left in the case of polar current. The indication of the teletype loop currents varies from zero to 60 milliamperes to either side of center.

The four teletype loop circuits for monitoring by switch 48 are designated as:

(1) KYBD which monitors the current in the keyboard contacts;

(2) PTR, which monitors the current driving the local printer coil;

(3) RX, which denotes the current in the receive (incoming data) communications line; and (4) TX, which denotes the current in the transmit (outgoing data) communication line.

When the meter select 48 is placed in the MAINS position, the meter monitors the output of the internal DC voltage which directly represents the condition of the mains voltage.

The local receptacles 52 provide a connection to the keyboard contact and printer of the local teleprinter. The line receptacles 54 provide a connection to the receive line and to the transmit line of the communications line. In the case of a half-duplex system, only two terminals to the line terminals are utilized (and two are strapped together), while in the case of a full-duplex, four of the line terminals are connected.

A universal key panel 56 includes a mechanical lock 58 which may be unlocked by a suitable mechanical key. Upon the unlocking of the lock 58, the panel 56 may be removed from the front panel 40 to expose seven octal switches numbered zero through seven, and an eighth switch containing the letters "U" and "C" to denote the Universal and Custom keys. As will be subsequently described, operation of the octal switches enables any of a plurality of codes to be mechanically set into the unit 10. Unit 10 must always have the same code entered therein as does the mating unit 18.

The mode select switch 60 comprises a three positioned rotary switch to enable switching between the OFF-LINE, ASYN (asynchronous) and SYN HD (synchronous) modes.

An ALARM RESET momentary push button switch 62 acts as a master reset and should be depressed each time the mode is changed to insure proper initialization of the equipment or to clear any alarm condition. The alarm reset button 62 should also be depressed to reset a break condition sent from a remote location. When the push button switch 62 is illuminated, it indicates that some fault or illegal operation has occurred in operation of the system. In such a case, the printer and the line will be inhibited. Once the push button switch 62 has been pressed, the illumination of the light should be extinguished. This push button switch also serves as a lamp test, and when the button is depressed, all the other lamps on the front panel and the audible alarm will be energized.

The BREAK momentary push button switch and indicator 64 may be depressed to perform a function similar to the break key on a teleprinter, thereby placing a "space" on both the local teleprinter and the transmit line. This break will be detected by the remote station and cause an audible alarm and a blinking break light at the remote station to alert the operator of the condition. When a break is received by the unit 10, the break indicator lamp 64 will blink, in combination with the generation of an audible alarm for alerting the operator.

The ENCIPHER push button switch and indicator 66 may be depressed to place the unit 10 in the encipher mode when operating in the off-line mode. When the unit is operating in either of the on-line modes, the indicator 66 is illuminated to indicate that traffic is being transmitted.

The DECIPHER push button switch and indicator 68 may be depressed to place the machine in the decipher mode when the unit is operating in the off-line mode. When the system is operating on-line, the indicator 68 will be energized to denote that the unit is receiving.

The PLAIN alternate action push button switch and indicator 70 may be depressed to place the system in the bypass or normal mode. When the indicator 70 is continuously illuminated, it denotes that the system is not in an enciphering or deciphering state. When in the off-line or ASYN mode, illumination of the indicator 70 denotes that the plain-to-crypto sequence has not been sent. If the indicator 70 is blinking, it denotes that the bypass mode has been placed in operation. When the bypass mode is selected, an audible beeping tone is heard once every four seconds to warn the operator that the system must be returned to the normal mode before transmitting secure traffic.

A CRYPTO illuminator 72 comprises a lamp indicator which denotes that the machine is either enciphering or deciphering. In either the OFF-LINE or ASYN mode, the crypto illuminator 72 will be illuminated only after the proper character sequence is recognized. The crypto illuminator 72 will be extinguished and the plain indicator 70 will be illuminated after another predetermined character sequence is recognized. In the SYN HD mode, the indicator 72 will always be illuminated.

The INITIATE push button switch and indicator 74 comprises a momemtary push button switch which is employed only when the system is in the SYN HD mode. When the SYN HD mode is first entered by changing the mode select switch 60, the indicator 74 begins to blink. Once the initiate push button switch 74 is depressed, and the synchronizing sequence of the invention has been transmitted, the indicator 74 will be continuously illuminated, thereby indicating that the machines are synchronized with one another. During synchronization, the indicator 74 is extinguished.

The SLAVE indicator 76 is illuminated only when the system is in the SYN HD mode. The indicator 76 is extinguished during the OFF-LINE and ASYN modes. When in the SYN HD mode and a synchronizing sequence has been received by the unit, the indicator 76 will be illuminated denoting the receiving unit as the slave unit.

A number of connections, not shown, are provided on the rear of the unit 10 shown in FIG. 5 to enable alternate AC power input and alternate local or line connections. In addition, switches, not shown, are provided internal to unit 10 to allow the user to select one of six main voltages to be utilized, or to select an internal battery voltage for driving the teleprinter loop circuits as desired. Switches, not shown, are also provided to enable selection of five baud rates, and three baud lengths. In addition, switches are provided within the unit, not shown, to enable either the full character set or a Telex character set to be utilized with the system.

If the full character set (FULL SET) is selected, all thirty-two Baudot (CCITT #2) characters appear in the encrypted output text of the unit, and the unit must thus be utilized on radio-teleprinter or hardwire circuits wherein the transmission path is transparent to the transmitted text. If the Telex character set (TELEX) is selected, the encrypted output text of the unit is fully compatible with TELEX and other switched five level networks, and encrypted text can be sent via all standard international message characters. Switches are also provided within the unit to allow connection of the system to either a two wire (half-duplex) circuit or a normal four wire (full-duplex) circuit.

Asynchronous Mode Operation

In operation of the unit 10 shown in FIG. 5, the power switch 44 is operated to turn the unit on. At this time, at least two of the front panel indicator lamps should be illuminated. To place the system in the asynchronous (ASYN) mode, the operators at both ends of the link should first set the identical code in both units, set the mode select switch 60 to the ASYN position and then press the alarm reset indicator 62 to insure proper initialization of the machines. From this point on, either operator can initiate typing on the teleprinter and traffic will be plain text, or unciphered, until one of the operators types in the character sequence LTRS QQ, followed by and five additional characters. This character sequence switches the unit at both the sending and receiving ends into the crypto mode.

Secure or encrypted traffic can then be transmitted back and forth alternately between either end of the communications link until either of the operators types the character sequence "CR,LF,LTRS,QK". This sequence returns both machines to plain or unenciphered operation. An additional feature which may be utilized when using the ASYN mode is the use of the "remote clear" sequence. This sequence consists of four "CR" characters typed in succession. Even if cryptographic synchronization is lost, the typing of the four "CR" characters forces both the sending and receiving units to the plain mode. Once both machines are in a plain mode, the "LTRS QQ" sequence is typed to return the unit to the crypto mode to reestablish cryptographic synchronization.

The asynchronous mode may be utilized for conversational traffic between two operators, as well as to send prepared plain text tapes which have the proper character sequences already punched in the tape. Once transmission begins from the tape reader, the unit switches back and forth between the plain and crypto modes as these control character sequences are encountered. The switching of the unit between the encipher and decipher modes is done automatically by the logic within the machines which senses traffic direction. When the unit is sending in the ASYN mode, the encipher indicator 66 will be illuminated. After the operator has typed "LTRS QQ" and five more characters, the crypto indicator 72 will be illuminated, verifying that the traffic is being enciphered.

When initiating a message, the operator will observe five random characters printed on the page printer of the teleprinter immediately after the "LTRS QQ" sequence, regardless of the character being typed on the keyboard. This is the automatic random prime being generated by the unit, as will be subsequently described. At the receiving end, the five characters which immediately follow the "LTRS QQ" sequence will be the "SPACE" character. All other printout at the local teleprinter will be plain text, regardless of the operating state of the unit.

Synchronous Mode Operation

With the synchronous (SHY HD) mode of operation, the unit has the capability of maintaining cryptographic synchronization over communications channels that are subject to severe fading and interference. This mode is thus especially useful over radio teletype networks, over long distances or under adverse communication channel conditions.

The unit 10 is a half-duplex unit, thus being able to either encipher (transmit) or decipher (receive) at a single time, but not both simultaneously. The equipment can be utilized over either a half-duplex (two-wire) or full-duplex (four wire) communication channel, and has expanded capability in this mode with a full-duplex channel.

Before traffic can be initialized in this mode, the transmitting and receiving machines must be synchronized. The unit initiating the synchronization process is designated the "master" and the terminal receiving synchronization is termed the "slave".

To place the unit in the synchronous mode on half-duplex communications channels, the mode select switch 60 is placed in the SYN HD position and the internal switches in the unit are placed in the HD (half-duplex) position. The alarm reset push button switch 62 is depressed to insure proper initialization of the machine. The operator will note that the initiate light 74 is blinking at this stage, the crypto indicator 72 is illuminated, and the local printer of the teleprinter is inhibited.

The synchronization sequence for this mode can be initiated by two methods. First, the initiate push button switch 74 may be depressed. Alternatively, the sequence "QZQZ" may be typed on the teleprinter keyboard. After the synchronization sequence is initiated, the local teleprinter will begin printing a sequence of approximately 50 characters. The operator should notice that the initiate indicator 74 is extinguished at this point, and as soon as the indicator 74 returns to an illuminated state and the teleprinter stops, secure traffic may commence.

The traffic should commence by typing a "LTRS" character on the teleprinter to insure that the machine on the receiving end is in the LTRS (lower) case. All copy of the local teleprinter after the synchronizing sequence is in the plain text, but all data transmitted over the communications line is enciphered. The synchronizing sequence may be reinitiated at any time by typing the character sequence "QZQZ" on the local keyboard or by pressing the initiate push button switch 74.

When the direction of traffic is to be reversed, the unit which wishes to send the message must become the master unit. A slave unit may become the master at any time by typing the character sequence "QZQZ" or pressing the initiate push button switch 74. The synchronous mode is not subject to any plain-to-crypto or crypto-to-plain control character sequences from the teleprinter. The only useable sequence is "QZQZ" which establishes synchronization. In the synchronous mode, the unit is always in crypto, unless the bypass is utilized.

When operated over a full-duplex communications channel, the unit has the capability of establishing cryptographic synchronization in both directions simultaneously, compensating automatically for communications channel time delay and permitting conversational communications. The direction of traffic can be reversed without having to resynchronize each time.

To begin operation in this mode, the internal switches in the unit must be in the FD (full-duplex) position and the mode select switch 60 must be set to SYN HD. The operator should press the alarm reset push button switch 62 to insure proper initialization of the machine. At this time, the crypto indicator 72 should be illuminated and the initiate light 74 should be blinking.

Synchronization may be accomplished by the same two methods previously described. While the sequence is being transmitted, the initiate light 74 is not illuminated. Once synchronization has taken place, the initiate light 74 is illuminated and secure traffic can be transmitted. At this point the slave light 76 is not illuminated, indicating that the transmitting station is the master station.

On the receiving end of the full-duplex communications channel when in the synchronous mode, the operator should prepare his machine by placing the mode select switch 60 in the SYN HD position, switching the system to a FD position and pressing the alarm reset push button switch 62. The initiate light 74 should be blinking at this point until the synchronizing sequence is received from the master station. When the synchronizing sequence is being received, the initiate light 74 will be extinguished and the slave light 76 will be illuminated. As soon as the synchronization has taken place, both the initiate light 74 and the slave light 76 will be illuminated and secure traffic can be received. However, in this situation, the slave terminal can transmit traffic without becoming the master. In this mode, it is not necessary for the operator to press the encipher push button switch 66 or the decipher push button switch 68, since enciphering and deciphering is done automatically by sensing the direction of traffic flow, thus facilitating conversational traffic.

Off-Line Mode Operation

To operate the system in the OFF-LINE mode, the local teleprinter should be switched to LINE for preparation of tape according to the "two-step" method. The mode select switch 60 should be set to the OFF-LINE position and the alarm reset push button switch 62 should be depressed. The plain push button switch 70 should then be depressed to place the unit in bypass operation, and the plain indicator 70 will begin blinking accompanied by a beep from the audible alarm to denote the bypass mode. The tape punch of the teleprinter should be turned on and the "LTRS" characters should be typed in several times for a leader. The header of the message to be sent should be typed in the teleprinter, and then the character sequence "LTRS QQ" and five "Q's" should be typed in, which is the required control sequence to switch to the crypto mode. The private portion of the message is then typed in the teleprinter. The control sequence "CR LF LTRS QK" is typed in order to return the unit to the plain mode. Any necessary trailer should then be typed into the teleprinter. The clear text tape thus prepared should be removed from the punch, thereby completing the first pass.

The clear text tape previously prepared in the first pass should be placed in the tape reader. If the key is properly set in the unit, the secure unit 10 should be placed in the normal mode by pressing the plain push button switch 70. The mode select switch 60 should be maintained in the OFF-LINE position and the alarm reset push button switch 62 should be depressed. The encipher push button switch 66 should then be depressed. The tape punch should then be turned on and the teleprinter placed in the line position. The tape reader is then started, and the crypto indicator 72 should be on during the private portion of the message, while the plain indicator 70 should be on during the header and the trailer bearing the clear text message. This completes the second pass and a tape bearing enciphered data has thus been prepared. The tape bearing the enciphered data is then transmitted through the teleprinter system as usual. The enciphered data is received by the recipient who has his tape punch turned on for the transmission, whereupon the tape is received and deciphered in the reverse manner.

Operation in Bypass Mode

The bypass feature in the unit 10 causes the system to be locked in the plain state and to be transparent to all data sent to it by the local teleprinter or by the line. The operation of the unit in all three modes previously described is unchanged, except that the enciphering/deciphering circuitry of the unit is inhibited. In this mode, no enciphering or deciphering can take place regardless of commands from the keyboard or the state of the crypto indicator.

The bypass feature is activated by pressing the plain push button switch 70. An audible alarm is heard every four seconds and the plain indicator 70 begins to blink to prevent inadvertent transmission of clear text. The plain push button switch 70 is again depressed to deactivate the bypass feature, thereby placing the unit in its regular enciphering/deciphering mode, which is referred to as the normal mode.

The bypass feature may be utilized while in either the on-line, asynchronous or synchronous modes. For example, it is sometimes convenient to activate the bypass momentarily for giving call signs in the clear, without disturbing cryptographic synchronization. The bypass mode can also be useful for the routine of preparing clear text tape off-line where the teleprinter does not have its own local mode.

Figure 6:
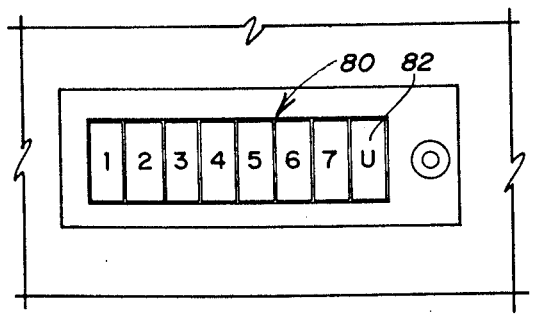
FIG. 6 is a view of the universal thumbwheel switches utilized to insert a particular code into the system.

FIG. 6 illustrates the seven octal switches 80 and the select switch 82 which are revealed when the panel 56 (FIG. 5) is removed from the front panel 40. Each of the seven switches 80 may be selectively positioned in any one of eight positions, and switch 82 may be set in either Universal or Custom position. When switch 82 is set in the Universal position, the switches 80 may be manually set to provide any one of two million Universal key settings into the present system. Both the transmitting and receiving units must be set with the Universal key having identical settings of switches 80 before communication can be established between the stations. The settings of the switches shown in FIG. 6 sets a predetermined code into the random code key generator of the invention, which is described in greater detail in U.S. Pat. No. 3,781,473, entitled "RANDOM DIGITAL CODE GENERATOR", issued Dec. 25, 1973, to the present assignee.

Figure 7:
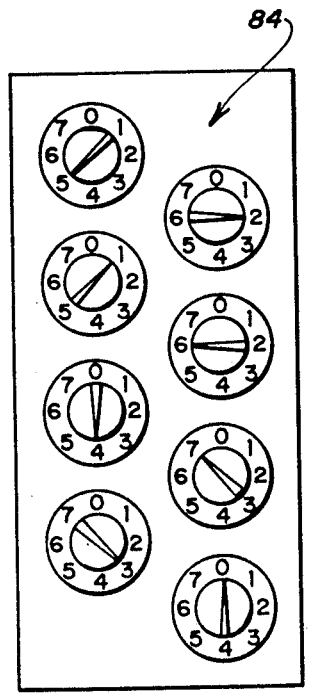
FIG. 7 is an illustration of the custom coding rotary switches utilized to set another degree of code complexity into the invention.

FIG. 7 illustrates another set of Custom code setting switches which are located inside the chassis behind the front panel 40 of the present unit. These switches enable a selection of any one of sixteen million Custom keys, which in combination with the Universal keys provide a total of 32,000,000,000,000 possible keys for the present unit. The Custom keys comprise eight rotary switches 84 which are octally coded so that digits 0–7 are available. To operate switches 84, the switch 82

(FIG. 6) is set to the "C" position and the front panel 40 of the unit is unlocked and swung forward to provide access to switches 84. Each switch 84 is set by rotating the center section of the switch in either direction until the pointer on the switch is adjacent the desired number. Prior to operation of the system in any of the three available modes, each unit must have a complete and identical Universal and Custom key set therein to provide proper encryption operation.

Definition of Circuit Signals

FIGS. 8-21 illustrate in detail the electronic circuitry of one of the encoder/decoder units of the present invention. A plurality of data, key control, timing and switch signals are utilized in the following figures, and to assist in a better understanding of the description, the following definition of signals is provided:

| Signal | Definition |
|---|---|
| PVT | private |
| FC2 | fast clock phase 2 |
| IP | initiate prime |
| FC1 | fast clock phase 1 |
| PLC | priming complete |
| RP | receive prime (tells key generator to load prime in) |
| RK | request key |
| ENDW | end wide - timing signal for key generator |
| KEY | key |
| CGD | code generator data (prime data loaded by RP) |
| PD | priming data (actual prime transmitted) |
| $\overline{K3CNT}$ | timing signal used by key generator to prevent forbidden character from appearing in prime |
| FULLSET | switch which selects either full set or Telex cipher set |
| P35X | timing signal - denotes 3-5 repetition of prime |
| BPφ2 | clock to drive correlator (8 × bit rate) |
| OEND | timing signal from output synchronizer denoting end of character |
| INITSW | initiate switch - press to initiate in synchronous mode |
| ILGSEQ | illegal sequence - denotes that sequences NNNN or ZCZC have occurred in cipher text |
| RXRAW | unaltered received data |
| $\overline{SYN}$ | denotes in synchronous mode |
| $\overline{SHD}$ | switch output denoting synchronous mode |
| ENC | encipher mode |
| CHECK | denotes alarm check circuit has detected simulated fault during priming |
| $\overline{ENC}$ | not in enciphering |
| ENC* | unbuffered encipher signal |
| COMP | compare - compares cipher text and plain text to drive check circuit |
| FIFOV | FIFO overflow - denotes data FIFO has overflowed-probably because transmitter receiver sending simultaneously |
| $\overline{BYPASSW}$ | bypass switch from front panel - cuts off all enciphering |
| CR | carriage return - denotes CR has been detected-only in Telex mode |
| CRFF | CR flipflop - remembers that CR was detected--allows next character to go out in clear |
| MCLR | Master clear - clears everything (from power on or reset button) |
| KEND ↑ | timing signal - denotes leading edge of end pulse of character from keyboard |
| MCLK | master controller clock - any state changes gives this clock |
| PRIMEX | synchronized signal denoting in prime state |
| SLAVE | denotes slave unit |
| FRAME | state of machine occurring only in synchronous mode and denotes sending frame synchronizing pattern |
| KEND ↓ | timing pulse from keyboard sync - |

-continued

| | |
|---|---|
| | denotes trailing edge of end of character pulse |
| P67 | timing pulse - prime being sent for 6th and 7th time |
| P35X | timing pulse - prime being sent for 3rd through 5th time |
| $\overline{\text{NULL}}$ | denotes null character detected - Telex mode only |
| $\overline{\text{BREAKSW}}$ | panel switch - push to cause break in line signal - to interrupt transmitter |
| $\overline{\text{RENDW}}$ | timing signal - denoting end pulse on receive synchronizer |
| ALARM | denotes 1 of 6 alarm conditions have occurred |
| KEND | keyboard sync end pulse |
| FIFOEMP | key FIFO empty |
| FIFOFULL | key FIFO full |
| $\overline{\text{REND}}$ | receive synchronous end pulse |
| $\overline{\text{ASYN}}$ | front panel switch denoting selected on-line asynchronous mode |
| $\overline{\text{SHD}}$ | front panel switch denoting selection of synchronous half-duplex mode |
| ILGCOM | illegal command - only in Telex mode - tried to put machine in crypto state when already in it |
| $\overline{\text{NSBYP}}$ | non sync bypass - allows previously encrypted tapes to be passed in bypass mode |
| $\overline{\text{ALL1}}$ | denotes key word is all "1's" - used in alarm circuit in case key generator gets stuck in all "1's" |
| CRYPTO | denotes crypto mode (private mode) |
| PRIME | denotes machine in prime state |
| OPR | denotes machine in operate state |
| REND ↓ | receive character end pulse - trailing edge |
| IDLE | denotes machine in idle state |
| P37 | timing pulse denoting prime sent 3rd through 7th time |
| P35 | prime sent 3rd through 5th time |
| PD* | reconstructed priming data from prime data card (A6) where it is stored |
| ORK | output request for key (timing signal from output synchronizer) |
| KRK | output request for key from keyboard |
| XPRIME | timing pulse denoting synchronizer transfer to priming state |
| GKSHIFT | gates shift pulse from keyboard synchronizer |
| RRK | request for key from receive synchronizer |
| KDRI | keyboard data register input - used as synchronized keyboard data signal |
| RXDAT | received data from line |
| GRSHIFT | gated shift pulse from receive synchronizer |
| RVALID | signal from receive synch just prior to center of start bit - sampled to make sure character is valid |
| $\overline{\text{OFFLINE}}$ | front panel mode select switch - offline mode |
| RDRI | received data register input |
| ID1 through ID5 | denote certain bit of parallel input data word |
| KSTART | denotes start bit from keyboard synchronizer |
| KSTOP | stop bit from keyboard synchronizer |
| OSHIFT | shift pulse from output synchronizer |
| KSHIFT | shift pulse from keyboard synchronizer |
| OEND ↑ | leading edge of end pulse from output synchronizer |
| REND ↑ | leading edge of end pulse from receive synchronizer |
| $\overline{\text{INV}}$ | signal to data FIFO denoting start and stop should be inverted (for frame synch pattern) |
| SK1-5 | parallel selected key - applied to either ROM or modulo-2 adders as |

-continued

| | | |
|---|---|---|
| | | key word |
| | RREAD* | timing pulse from receive synchronizer |
| | $\overline{\text{RESPONSE}}$ | timing signal used to tell printer when to print response from slave signal (when to stop) |
| | $\overline{\text{FSC}}$ | frame sync complete |
| | $\overline{\text{PRTRESS}}$ | timing signal to tell printer when to start |
| | KBDAT | keyboard data |
| | $\overline{\text{KAR}}$ | timing pulse from keyboard synchronizer |
| | RSHIFT | shift pulse from receive synchronizer |
| | KSTB | strobe pulse from keyboard synchronizer used to load data FIFO |
| | $\overline{\text{RAR}}$ | timing pulse from receive synchronizer used to strobe ROM - enciphers in Telex mode |
| | OD1-5 | parallel output data word |
| | ODRO | output data register output |
| | ENFIFO | tells when to enable FIFO |
| | RSTB | strobe pulse from receive synchronizer used to load data FIFO |
| | FIFOMR | FIFO master reset |
| | GFSD | gated frame sync detect |
| | QQ | denotes sequence LTRS QQ detected |
| Only in off-line and asynchronous mode | 4CR | denotes 4 CR characters have been detected - used to remotely clear machine in Telex or off-line mode even if crypto sync lost |
| | QK | denotes sequence CR LF LTRS QK detected - switches from crypto back to plain |
| | QZQZ | denotes sequence QZQZ detected - causes machine to be initiated in synchronous half-duplex mode |
| | CP$\phi$2 | phase 2 of a 2 phase clock (basic system timing) |
| | CP$\phi$1 | phase 1 of a 2 phase clock (basic system timing) |
| | KSYNEN | denotes keyboard synchronizer enabled |
| | RSTART | denotes start bit from receive synchronizer |
| | PRINT | denotes incoming character from line had valid start bit and character should be printed |
| | FSD | frame synch detect - denotes correlator has detected frame synch from line-switch to load prime mode |
| | $\overline{\text{EN45}}$ $\overline{\text{EN57}}$ | signals from baud rate select switch located on power supply module |
| | $\overline{\text{EN50}}$ $\overline{\text{EN100}}$ | A21 - select baud rate |
| | OSTOP | denotes stop bit from output synchronizer |
| | O3CNT | denotes 3rd bit of output sync - used on data switching card to generate space character-used on printer when loading prime |
| | OSYNEN | output synchronizer is enabled |
| | KVALID | similar to RVALID - pulse to validate start bit (from keyboard) |
| | C2RESET | insures correlation reset immediately after frame synch detected |
| | C2 | state of correlator controller denoting it is looking for final inverted pattern |
| | BP$\phi$1 | 2$\phi$ clock - operates correlator (8 $\times$ bit rate) |
| | CIRC | denotes correlator should circulate contents of register to count the number of ones |
| | PEAK | denotes correlator has detected a peak |
| | $\overline{\text{INITSW}}$ | initiate switch |
| | $\overline{\text{BYPASSW}}$ | bypass switch |
| | $\overline{\text{DECSW}}$ | decipher switch |
| | $\overline{\text{ENCSW}}$ | encipher switch |
| | $\overline{\text{BREAKSW}}$ | break switch |
| | $\overline{\text{RESETSW}}$ | reset switch |

-continued

| | |
|---|---|
| BREAKLP | break lamp |
| ALARMLP | alarm lamp |
| INITLP | initiate lamp |
| SLAVELP | slave lamp |
| PLAINLP | plain lamp |
| CRYPTOLP | crypto lamp |
| ENCLP | encipher lamp |
| DECLP | decipher lamp |
| CORP | signal from front panel switch denotes in custom mode - 32 trillion keys |
| LINEFD | denotes line switch is set to full-duplex position |
| HORN | denotes signal that drives audible alarm |
| KBRAW | unaltered keyboard data |
| TXDAT | transmit data (from logic to interface circuitry) |
| RXRAW | unaltered receive data |
| FANAC | 115 VAC from power supply to fan |
| BAUD7.5 | denotes baud length set to either 7.42 or 7.5 |
| LOCALHD | local switch in half-duplex position |
| MAINSMON | mains monitor |

Panel Circuitry

Figure 8:
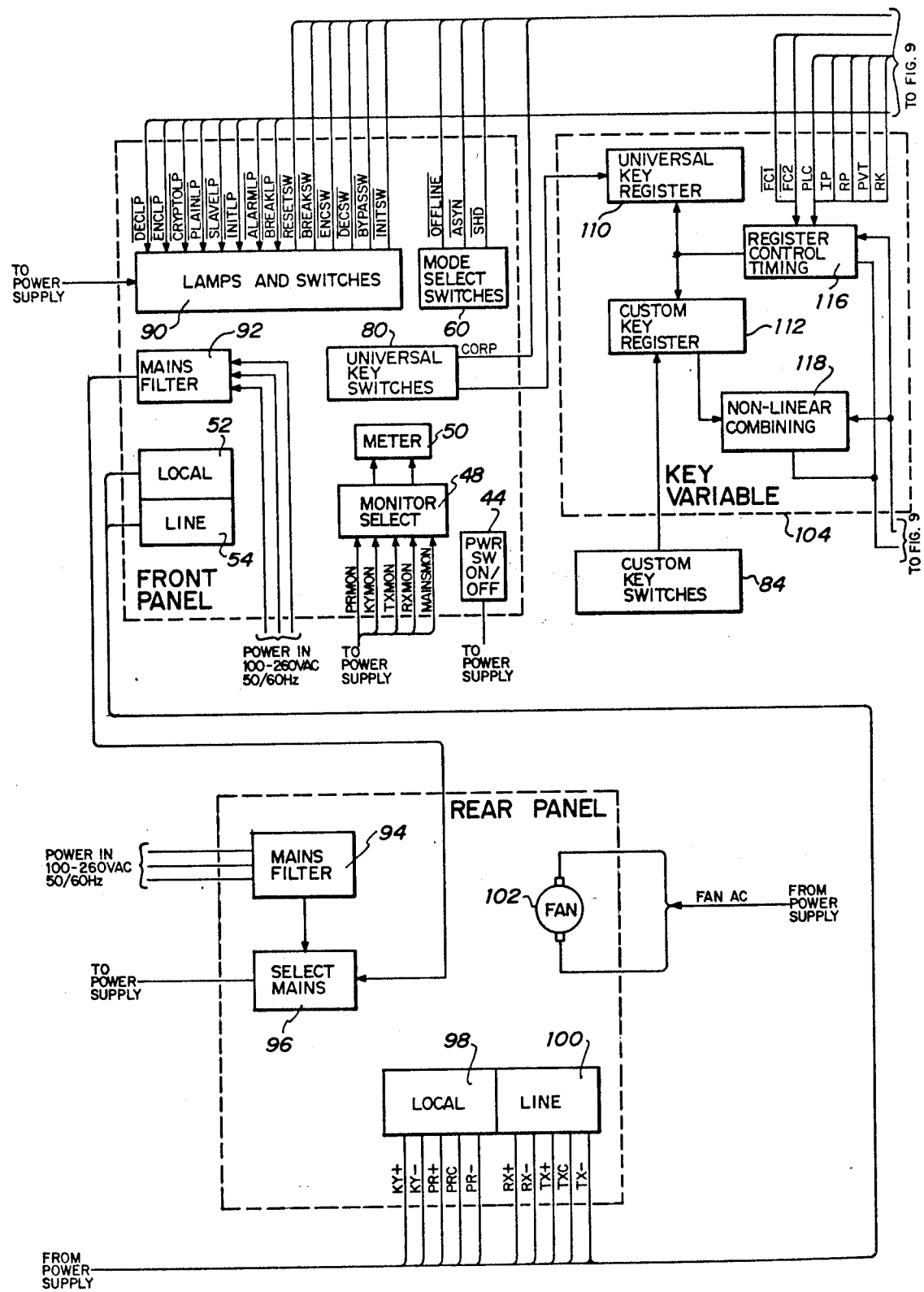
FIG. 8 is a block diagram of the front panel, rear panel and key variable circuits of the invention.

Referring to FIG. 8, a block diagram of the rear and front panel switch circuitry is illustrated. Like numerals are utilized for like and corresponding parts of the various drawings. The switches and lamps on the front panel shown in FIG. 5 are represented by the block 90, with the lamp energizing signals and switch output signals being applied thereto. The mode select switch 60 is also illustrated. Power from a suitable alternating current source is applied to the mains filter 92 and to a mains filter 94. The select mains switch 96 selects the mains to be utilized. Telegraphic loop currents from the power supply are applied to local terminals 98 and line terminals 100 to enable interconnection of the system in the various modes. The output from the power supply is also supplied to the local terminals 52 and line terminals 54 (FIG. 5). The meter 50 is operated in accordance with the setting of the monitor select switch 48. The power switch 44 is also operated from the front panel as previously described. The Universal thumbwheel switches 80 are operable upon the removal of the panel 56 in the manner described with respect to FIG. 6. AC power is applied to the rear panel to operate a fan 102 for cooling off the housing.

Random Code Generator

Figure 9:
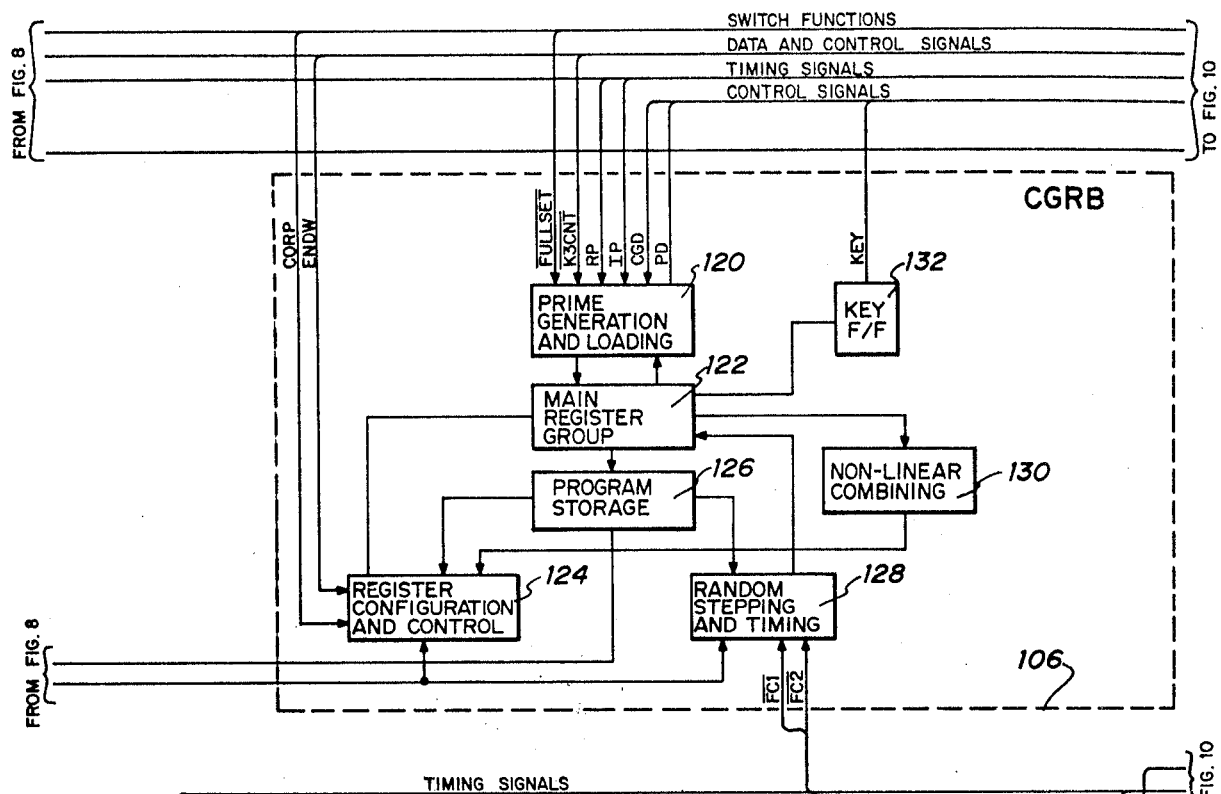
FIG. 9 is a block diagram of the code generator and prime data circuits of the invention.
Figure 9:
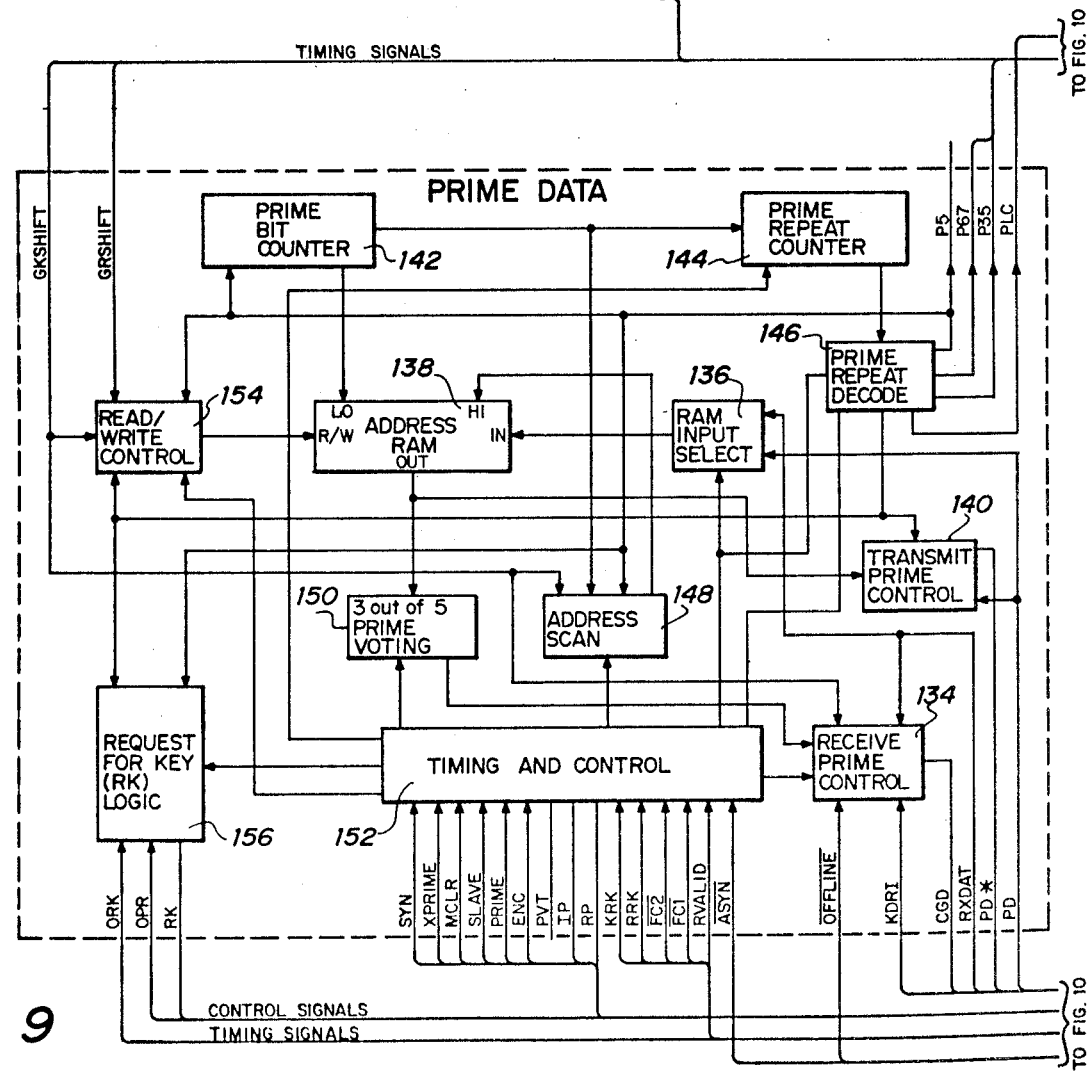

The randomized digital keystream which is the basis for enciphering and deciphering with the present system is generated by the key variable circuit shown within the dotted line 104 in FIG. 8 and in the dotted line 106 in FIG. 9. Referring to FIG. 8, the outputs from the Universal key switches 80 are applied to a Universal key register 110. The Custom key switches 84 (FIG. 7) are applied to a Custom key register 112. The register control and timing circuitry 116 controls the operation of the registers 110 and 112. The outputs of the registers are applied to a nonlinear combining circuit 118, the output of which is applied to the random key generator shown in the dotted line 106 in FIG. 9.

Referring to FIG. 9, a prime generation and loading circuit 120 receives timing and loading instructions in order to control the loading of the main register group 122. A register configuration and control circuit 124 controls the interconnections of the main register group in the desired manner. The output of the register group 122 is applied to a program storage circuit 126 which is interconnected with a random stepping and timing circuit 128. The output of the main register group 122 is applied to a nonlinear combining circuit 130, the output of which is applied to control the register configuration and control circuit 124. The resulting configuration and stepping of the main register group 122 results in a randomized digital signal which is applied to a key flipflop 132. The flipflop 132 generates a long stream of randomized digital signals for use in enciphering and deciphering in the present invention.

The random code generator of the system shown in FIGS. 8 and 9 comprises a group of registers 122 which may be combined in various configurations and stepped a number of random steps in order to generate a single bit of key data. The request for key (RK) signal is applied to the prime generation and loading circuit 120 in order to cause the main register group 122 to connect themselves in a random fashion, take a random number of steps, and generate a single bit of key which is stored in the key flipflop 132. Each character typed on the keyboard generates five requests for key and generates five bits of key. These five bits of key are accumulated serially in the key word register to be subsequently described. The key word register governs how the particular character is to be enciphered or deciphered.

Two other principal signals controlling the key generator circuit are the initiate prime (IP) and receive prime (RP). The first five characters after the system has been commanded into the crypto mode are termed priming characters. When enciphering, the signal IP instructs the key generator to generate and supply five random characters (25 bits of random data) to the prime generation and loading circuit 120 to generate the priming data (PD).

When deciphering, the signal RP instructs the key generator to accept the five characters applied as a signal CGD in order to load the characters into the main registers 122. At the same time that prime is being received or generated, the crypto variables located on the Universal key switches 80 and the Custom key switches 84 are being loaded in parallel into their respective registers 110 and 112. Once these variables have been loaded and the prime has been received or generated, the key generator begins to generate key bits as requested by the signal RK. The signal CORP instructs the key generator to go into the Custom mode which offers the user the full 32 trillion key variable combinations.

Just as there are forbidden characters in the cipher text, the prime characters which are generated by the key generator must also be free of forbidden characters if the Telex cipher set is to be selected. The two signals $\overline{\text{K3CNT}}$ and the signal $\overline{\text{FULLSET}}$ prevent the generation of forbidden characters in the prime data if the system is set to the Telex mode. The timing for the key generator is supplied by the two phase high speed clocks termed $\overline{\text{FC1}}$ and $\overline{\text{FC2}}$.

For a more detailed description of the construction operation of the random code generator of the invention, reference is made to U.S. Pat. No. 3,781,473, entitled "RANDOM DIGITAL CODE GENERATOR", issued Dec. 25, 1973, and assigned to the present assignee.

Prime Data Circuit

The circuit for generating the prime data for use with the present system is illustrated in FIG. 9. This circuitry accumulates, checks and transmits the five random priming characters that precede each enciphered transmission by the system. In both the off-line and asynchronous modes of operation, the priming data from the key generator previously described (termed PD) is routed immediately from the key generator to the controller for transmission on-line or routed to the local teleprinter for off-line operation.

In both of these modes, the prime data received from decoding a tape off-line or from receiving an enciphered message on-line, is collected by a receive prime control circuitry 134 and sent to the key generator as the signal CGD. When enciphering in both the off-line and asynchronous modes of operation, the five priming characters (or 25 priming bits) are routed from the key generator to the printer or line immediately, with no modification supplied to the prime data circuit shown in FIG. 9. When deciphering, the five prime characters are routed from the receive data line or keyboard immediately to the key generator, with again no modification from the prime data circuit shown in FIG. 9.

However, in the synchronous mode (SYN HD), the prime data is transmitted five times. This amount of redundancy is required because correct reception of prime is essential in cryptographic synchronization in the synchronous mode. When the prime state is entered in the synchronous mode, the key generator is requested to deliver 25 bits of priming information just as in the other two modes. This priming data, PD, is now transmitted and simultaneously routed to a random access memory (RAM) input select circuit 136 to the input of a random access memory (RAM) 138 for storage. The prime is then retransmitted four additional times from the RAM 138 through a transmit prime control circuit 140 to the controller as the signal PD*. This results in the transmission of prime five times and also allows the receiving unit to make a three-out-of-five decision as to the correct reception of prime.

A prime bit counter 142 keeps track of which bit of prime is being acted upon by the RAM 138 and provides the address for the RAM 138. A prime repeat counter 144 keeps track of how many times the 25 bits of prime has been transmitted. Counter 144 is decoded by a prime repeat decode 146 and generates signals such as signal P5 which indicates the fifth transmission of the prime information.

When receiving the priming sequence in the synchronous half-duplex mode (SYN HD), the first four priming sequences are stored in the RAM 138. As the fifth priming sequence is being entered, address scan circuitry 148 rapidly accesses the corresponding bits from the first four priming sequences and a three-out-of-five prime voting circuit 150 performs a three-out-of-five prime vote to determine what the correct priming bit should be. In other words, the logic level of the five priming bits are detected and the final level is determined by the largest number of a particular logic level in the detected five levels. Once the decision has been made, the three-out-of-five prime voting circuitry 150 routes the results to receive prime control 134 in order to be loaded into the key generator as valid priming information CGD.

Timing and control for the circuitry is provided by timing and control 152. A read/write control circuit 154 operates to control the reading or writing into the RAM 138. The request for key (RK) logic 156 generates the request for key (RK) for the code generator. Depending upon which mode of operation in which the system is operating, the key generator is under the command of either the receive, output or keyboard synchronizers, as will be subsequently described. A request for key logic 156 determines which synchronizer has control and generates the request at the proper time, in a manner to be subsequently described in greater detail.

Alarm Circuit

Figure 10:
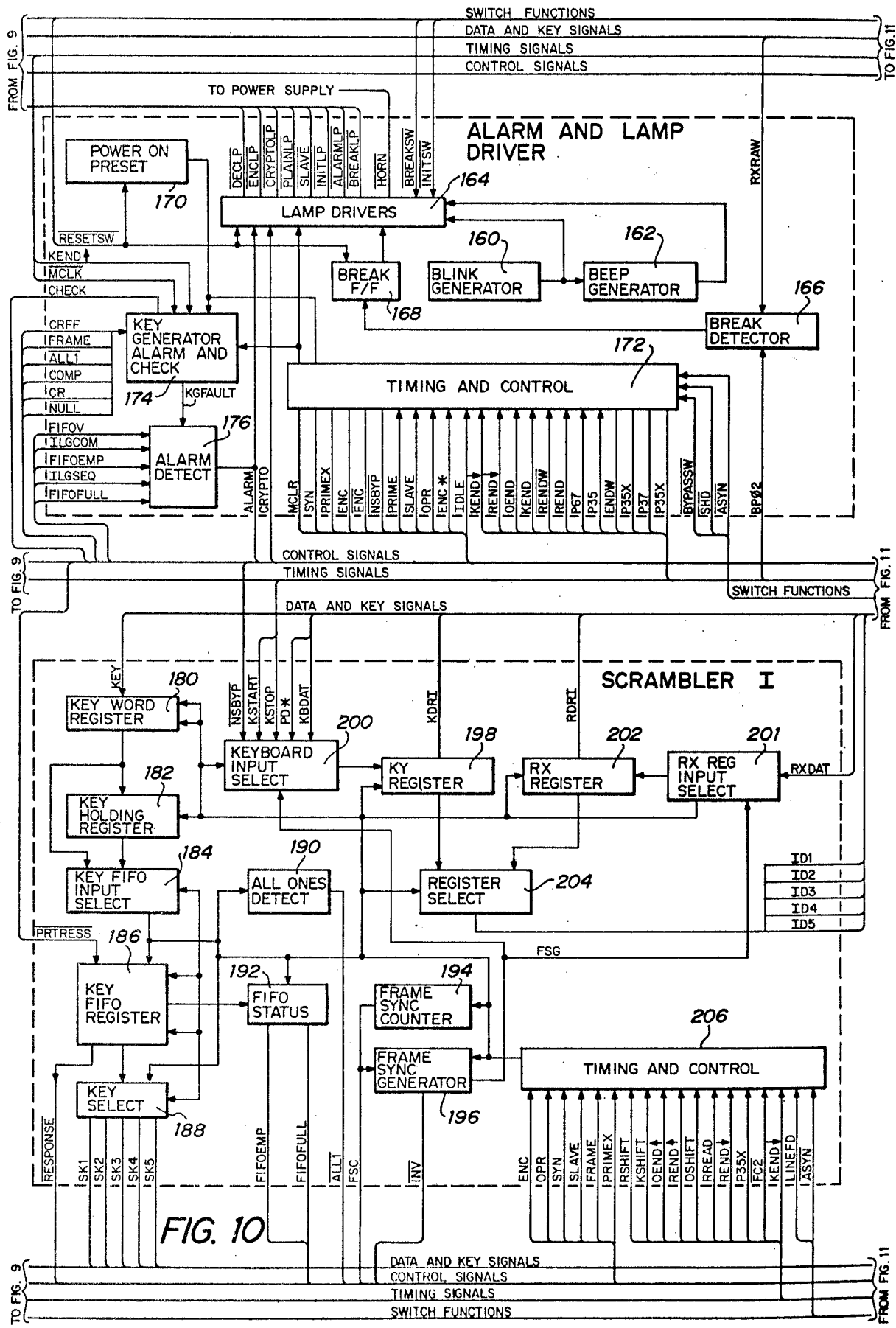
FIG. 10 is a block diagram of the alarm and lamp driver and Scrambler I circuits of the invention.

FIG. 10 illustrates the alarm and lamp driver circuitry of the invention which drives the eight front panel lamps previously described. The circuitry also drives an audible alarm by the generation of the signal $\overline{\text{HORN}}$.

The alarm and lamp driver circuit contains all of the lamp driver circuits and logic to drive the eight front panel lamps. A blink generator 160 and the beep generator 162 generate timing signals for the flashing lights and the periodic beep of the audible alarm. The generators 160 and 162 are connected to the lamp driver circuit 164, which generates lamp driving signals.

A break detector circuit 166 senses an open condition on the receive data line labeled RXRAW. If an open condition lasts for approximately two characters duration, a break flip-flop 168 is set and the break lamp will begin flashing. The power on preset circuit 170 provides a clearing pulse on the master reset line MCLR to insure that the system is in a cleared condition after the application of power. The signal MCLR is also generated any time that the alarm reset switch 62 (FIG. 5) is depressed. The timing and control for the circuitry is provided by the timing and control circuitry 172.

The key generator alarm and check circuit 174 constantly monitors the cipher text and plain text being generated within the system. Should a fault occur in the key generator, such as the key being stuck at a logical "0" or logical "1", the cipher text and plain text will become equal or complements of each other. Should this condition occur for five consecutive characters, the key generator alarm and check circuit 174 will detect the malfunction and generate the signal KGFAULT. This signal is applied to the alarm detect circuit 176. The key generator alarm and check circuitry is self checking. Each time the system is commanded to the crypto mode, a simulated fault condition is applied to the key generator alarm and check circuitry 174 during the priming sequence, and a signal called CHECK is required from the circuit before the machine can switch to the crypto mode. Once the check signal has been generated by the key generator alarm and check circuit, and the machine has entered the crypto mode, any subsequent malfunction will be considered a key generator fault.

The only time that the key generator alarm and check circuit is disabled is during a Carriage Return, Line Feed, or a Null character. These characters are passed unciphered and the alarm circuit should be disabled when they occur. These three conditions are denoted by the signals CR, CRFF, and $\overline{\text{NULL}}$. The signal COMP denotes that the ciper text and plain text have compared and is one step toward an alarm condition. Likewise, the signal $\overline{\text{ALL1}}$ denotes that the key word generated is all logical ones. Five consecutive characters with either of these conditions being true will cause the generation of an alarm.

The key generator FAULT is only one of six alarm conditions. For a more complete description of alarm and check circuitry, reference is made to U.S. Pat. No. 3,781,472, entitled "DIGITAL DATA CIPHERING TECHNIQUE", issued Dec. 25, 1973, and assigned to the present assignee.

The remaining alarm conditions include the typing in of an illegal command. If the system is being used in the OFF-LINE or ASYN mode, the character sequence LTRS QQ is typed while the system is already in the crypto mode, this is termed an illegal command (ILG-COM) and will result in the generation of an alarm. To recover, the alarm reset indicator is pressed and the message is reenciphered from the beginning.

On rare occassions, such as once every 350,000 characters, the sequences NNNN or ZCZC will occur in the cipher text. Since these should not appear in the cipher text, an alarm condition (ILGSEQ) is indicated if either of these sequences occur. This alarm is used primarily in the off-line mode when preparing enciphered data to be transmitted over a Telex network. To recover from this alarm situation, the alarm reset indicator is depressed and the message reenciphered.

Additionally, the data buffer may exceed its capacity due to an internal fault. If this fault occurs (FIFOV), an alarm is also generated. To recover, the alarm reset button is depressed.

In the SYN HD mode with full-duplex channel, the key buffer may become empty (FIFOEMP) due to an internal fault, if this condition exists, an alarm is generated. To recover, the alarm reset indicator is depressed.

The last alarm condition is caused by the failure of the master unit to receive the acknowledge from the slave unit when in the SYN HD mode with full-duplex channel. If this slave station has its LINE switch in the HD position while operating in the SYN HD mode, the slave station will fail to give a suitable response to the master unit. This lack of response will cause the master unit to enter the alarm condition (FIFOFULL) approximately ten seconds after the synchronization process is complete. To recover from this condition, the operator of the slave unit must be informed to place his LINE switch in the FD position.

The six alarm conditions are OR'ed together to generate the signal ALARM by the alarm detect circuit 176.

Scrambler I

FIG. 10 also illustrates the Scrambler I circuit which includes most of the key word handling circuitry. As the key data is requested by the prime data circuit, it is accumulated serially in the key word register 180. In the synchronous mode, it is necessary to hold the key data in the key holding register 182, in order to synchronize the key (which is being generated synchronously) with the data which can be entered from the keyboard in an asynchronous fashion. In both the off-line and asynchronous modes, the key data is accumulated in the key word register 180 and then routed in parallel through the key first in-first out (FIFO) input select circuitry 184, around the key FIFO register 186 and out through the key select circuitry 188. The selected key word appears in parallel labeled SK1 through SK5. In the synchronous mode, the key is accumulated in the key word register 180 and transferred in parallel into the key holding register 182. It is then routed through the key FIFO select circuitry 184 to the key FIFO register 186. The key FIFO register 186 is a first in-first out register which stores the key word for use in the synchronous mode with a full-duplex channel.

In the SYN HD mode, if cryptographic synchronization is to be established in both directions simultaneously, the enciphered data at the master station must be enciphered with real time key. However, the received enciphered data must be deciphered with key that was generated at an earlier time. When the unit is operating as a master, the key FIFO register 186 holds the key generated and compensates automatically for the transmission delays encountered through the channel. The signal inputs labeled $\overline{\text{PRTRESS}}$ and RESPONSE are timing signals which enable the master unit to establish the correct time at which the response from the slave unit should be printed.

The all one's detect circuit 190 determines when the key accumulated in the key word register 180 is in the all one's condition. This is used for alarm check purposes in the alarm circuit. The FIFO status circuit 192 is used to determine whether or not the key FIFO register 186 is empty or has overflowed. Both of these conditions constitute an alarm. The frame sync counter 194 and the frame sync generator 196 are utilized during the preamble to the synchronization sequence wherein a series of characters are transmitted which are recognized by the remote station as the frame sync pattern. The frame sync counter 194 keeps track of the number of characters transmitted in this sequence and the frame sync generator 196 generates the proper character in the sequence. This series of characters will be subsequently described in greater detail.

The data from the keyboard is accumulated serially in the keyboard data register 198. The input to the keyboard data register 198 can be any one of three inputs; PD*, KBDAT, and FSG. Since the data accumulated in the keyboard data register 198 represents the data to be transmitted, it normally consists of the keyboard data, KBDAT. However, during the priming sequence, the prime data from the key generator must also be supplied to the keyboard data register for subsequent transmission. This is denoted by the signal PD*. In the synchronous mode, the keyboard data register 198 must also be loaded with the output of the frame sync generator for transmission of the frame sync pattern.

The signals KSTART and KSTOP are applied to the keyboard input select 200 in order to attach a proper start and stop bit to the key generator priming data, PD*. Since these are random information bits from the key generator, they must be converted to legal telegraph characters before transmission. The signal KDRI is a synchronized signal representing the keyboard input.

Data from the receive line, RXDAT, can also be selected by the RX register input select 201 and accumulated serially in the RX data register 202. The selection of which register to use is made by the register select 204, depending on whether or not the system is enciphering or deciphering. This parallel selection is then routed through to the enciphering circuitry in the form of five input data lines labeled ID1 through ID5. The signal RDRI is a synchronized serial data signal representing the received input data. Timing for the Scrambler I circuit is provided by the timing and control circuit 206.

Scrambler II

Figure 11:
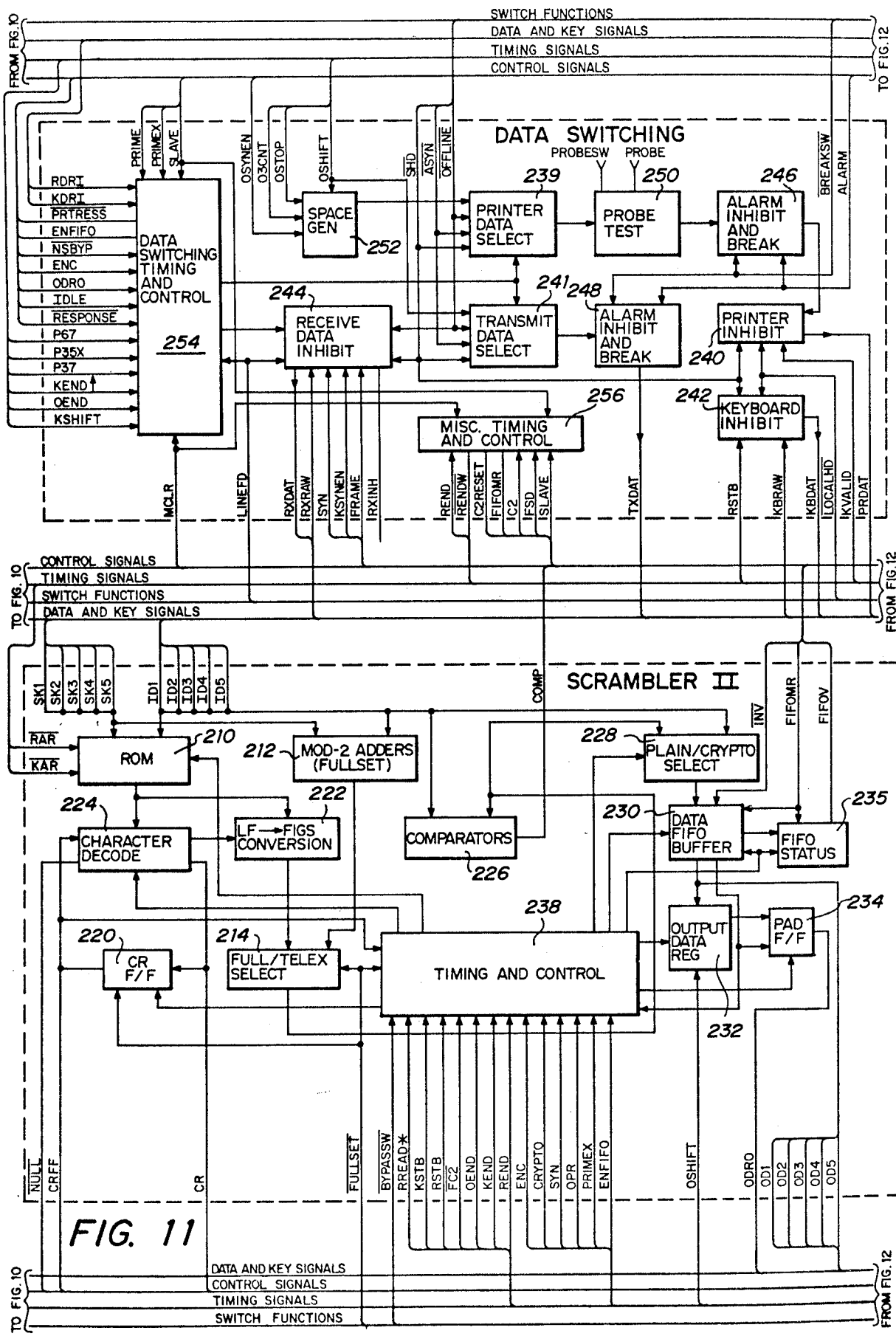
FIG. 11 is a block diagram of the data switching and Scrambler II circuits of the invention.

FIG. 11 illustrates the Scrambler II circuit which consists of the system enciphering/deciphering circuitry as well as the data FIFO buffer. The selected key bits SK1 through SK5, as well as the selected input data words ID1 through ID5, are applied to a read only memory (ROM) 210, as well as the modulo-2 adders 212. Both of these circuits perform the enciphering-/deciphering algorithm. The ROM 210 generates a telex compatible cipher-set of 29 characters, which has eliminated the three forbidden Telex characters, in a somewhat similar manner as that described in previously noted U.S. Pat. No. 3,781,472. The other enciphering circuitry, the modulo-2 adders 212, provide a full 32 character output. This is known as the full cipher set. The selection of which set is to be used is performed by the FULL/TELEX select 214. This select circuit 214 is actuated by the SET switch located on the power supply module.

When using the Telex-set, the output of ROM 210 must be modified in some instances. Whenever a line feed (LF) character results from a decipher operation, the previous character must be examined to determine whether or not it was a carriage return (CR). If the previous character was not a CR as determined by the circuit CR F/F 220, the LF-to-FIGS conversion circuitry 222 converts the LF to a FIGS character. In order to set the CR F/F 200, a character decode circuit 224 determines whether or not the output of the ROM 210 is a CR, a LF or a NULL character.

The output of the Full/Telex select 214 is applied to comparators 226 as well as the Plain/Crypto select circuitry 228. The comparators 226 compare the enciphered data with the unenciphered input data and the result, COMP, is used in the alarm circuit. The Plain/Crypto select circuitry 228 selects the unciphered input data, ID1 through ID5, or the enciphered circuitry from the Full/Telex select 214. This selection depends upon the mode of the system. For instance, if in the off-line or asynchronous mode, the input data would be selected prior to the plain-to-crypto sequence and the output of the Full/Telex select 214 would be selected after the sequence. In the synchronous mode, the enciphered data is always selected, except when the BYPASS switch has been activated.

The output of the Plain/Crypto select 228 is applied to the data FIFO buffer 230. Buffer 230 is essential in smoothing out the timing differences in the synchronous mode. In the synchronous mode, the data is transmitted under the control of the highly accurate clock. Each character is located precisely within a timing pattern. Since the data from the keyboard is not in synchronization with the transmission line, the data FIFO buffer 230 automatically holds the character from the keyboard until such time as the line is ready for a new character. When the line is ready for a new character, the output of the data FIFO buffer 2300 is transferred in parallel to the output data register 232. The output data register 232 is then shifted serially through the pad flip-flop 234 to the data switching circuitry in the form of the signal ODRO. The status of the FIFO buffer is detected by FIFO status 235.

If the line is ready for a new character to be transmitted and none is present in the data FIFO buffer 230, the pad flipflop 234 is set which puts a "mark hold" on the line precisely equal to one character in length. Since the transmission line is running slightly faster than the maximum normal keyboard input rate, approximately every 10 to 15 characters, the pad flipflop 234 will be set to allow the keyboard to catch up with the line. The FIFO status flipflop 235 determines whether or not the data FIFO buffer 230 has overflowed to provide one of the alarm conditions. Timing for the Scrambler II circuit is provided by the timing and control 238.

An important aspect of the present invention is the encoding and decoding provided by the ROM 210. A suitable ROM for use with the present invention is the 4854 Read Only Memory manufactured and sold by Electronic Arrays, Inc. of Mountainview, Calif., which has a 2048×8 memory capacity.

Briefly, for enciphering, the ROM 210 contains enciphered digital representations of all of the characters in the Telex cipher set, the enciphered representations being grouped in addressable subsets according to the generated clear text digital word and the generated digital key word. Therefore, for a particular clear text character to be enciphered and for a particular key word, an address signal is generated in order to access a particular encoded digital word. This digital word is then output as an encoded character. The three forbidden characters are not stored within the ROM 210 and are thus not generated. The binary digital representations stored within the ROM 210 are represented in an octal form in order to simplify the description of the ROM.

Similarly, for deciphering, decoded binary representations are stored in the ROM in order to generate clear text characters in response to specific combinations of an enciphered digital character and a random key word. These digital representations are also represented in octal form.

Tables I and II set forth below are representative of portions of the stored data within the ROM 210. Table I represents a portion of the stored data for encoding, while Table II represents a portion of the stored data for decoding.

TABLE I

| Key ↓ | Data T | NULL Z | E L | LF W | A H | SP Y | S P | I Q | U O | CR B | D G | R FIGS | J M | N X | F V | C LTRS | K |
|---|---|---|---|---|---|---|---|---|---|---|---|---|---|---|---|---|---|
| K=0 | 0000 | 000 | 001 | 002 | 003 | 004 | 005 | 006 | 007 | 010 | 011 | 012 | 013 | 014 | 015 | 016 | 017 |
|  | 0020 | 020 | 021 | 022 | 023 | 024 | 025 | 026 | 027 | 030 | 031 | 032 | 002 | 034 | 035 | 036 | 037 |
| K=1 | 0040 | 000 | 021 | 022 | 023 | 024 | 025 | 026 | 027 | 010 | 031 | 032 | 007 | 034 | 035 | 036 | 037 |
|  | 0060 | 030 | 011 | 012 | 013 | 014 | 015 | 016 | 017 | 004 | 005 | 006 | 022 | 002 | 003 | 001 | 020 |
| K=2 | 0100 | 000 | 011 | 012 | 013 | 014 | 015 | 016 | 017 | 010 | 005 | 006 | 027 | 002 | 003 | 001 | 020 |
|  | 0120 | 004 | 031 | 032 | 007 | 034 | 035 | 036 | 037 | 024 | 025 | 026 | 012 | 022 | 023 | 021 | 030 |
| K=3 | 0140 | 000 | 031 | 032 | 007 | 034 | 035 | 036 | 037 | 010 | 025 | 026 | 017 | 022 | 023 | 021 | 030 |
|  | 0160 | 024 | 005 | 006 | 027 | 002 | 003 | 001 | 020 | 014 | 015 | 016 | 032 | 012 | 013 | 011 | 004 |
| K=4 | 0200 | 000 | 005 | 006 | 027 | 002 | 003 | 001 | 020 | 010 | 015 | 016 | 037 | 012 | 013 | 011 | 004 |
|  | 0220 | 014 | 025 | 026 | 017 | 022 | 023 | 021 | 030 | 034 | 035 | 036 | 006 | 032 | 007 | 031 | 024 |
| K=5 | 0240 | 000 | 025 | 026 | 017 | 022 | 023 | 021 | 030 | 010 | 035 | 036 | 020 | 032 | 007 | 031 | 024 |
|  | 0260 | 034 | 015 | 016 | 037 | 012 | 013 | 011 | 004 | 002 | 003 | 001 | 026 | 006 | 027 | 005 | 014 |
| K=6 | 0300 | 000 | 015 | 016 | 037 | 012 | 013 | 011 | 004 | 010 | 003 | 001 | 030 | 006 | 027 | 005 | 014 |
|  | 0320 | 002 | 035 | 036 | 020 | 032 | 007 | 031 | 024 | 022 | 023 | 021 | 016 | 026 | 017 | 025 | 034 |
| K=7 | 0340 | 000 | 035 | 036 | 020 | 032 | 007 | 031 | 024 | 010 | 023 | 021 | 004 | 026 | 017 | 025 | 034 |
|  | 0360 | 022 | 003 | 001 | 030 | 006 | 027 | 005 | 014 | 012 | 013 | 011 | 036 | 016 | 037 | 015 | 002 |
| K=8 | 0400 | 000 | 003 | 001 | 030 | 006 | 027 | 005 | 014 | 010 | 013 | 011 | 024 | 016 | 037 | 015 | 002 |
|  | 0420 | 012 | 023 | 021 | 004 | 026 | 017 | 025 | 034 | 032 | 007 | 031 | 001 | 036 | 020 | 035 | 022 |
| K=9 | 0440 | 000 | 023 | 021 | 004 | 026 | 017 | 025 | 034 | 010 | 007 | 031 | 014 | 036 | 020 | 035 | 022 |
|  | 0460 | 032 | 013 | 011 | 024 | 016 | 037 | 015 | 002 | 006 | 027 | 005 | 021 | 001 | 030 | 003 | 012 | effective Combined Address in Octal ↑

TABLE II

Enciphered Characters

| Key ↓ | Data T | NULL Z | E L | LF W | A H | SP Y | S P | I Q | U O | CR B | D G | R FIGS | J M | N X | F V | C LTRS | K |
|---|---|---|---|---|---|---|---|---|---|---|---|---|---|---|---|---|---|
| K=0 | 2000 | 000 | 001 | 002 | 003 | 004 | 005 | 006 | 007 | 010 | 011 | 012 | 013 | 014 | 015 | 016 | 017 |
|  | 2020 | 020 | 021 | 022 | 023 | 024 | 025 | 026 | 027 | 030 | 031 | 032 | 002 | 034 | 035 | 036 | 037 |
| K=1 | 2040 | 000 | 036 | 034 | 035 | 030 | 031 | 032 | 013 | 010 | 021 | 022 | 023 | 024 | 025 | 026 | 027 |
|  | 2060 | 037 | 001 | 002 | 003 | 004 | 005 | 006 | 007 | 020 | 011 | 012 | 034 | 014 | 015 | 016 | 017 |
| K=2 | 2100 | 000 | 016 | 014 | 015 | 020 | 011 | 012 | 023 | 010 | 001 | 002 | 003 | 004 | 005 | 006 | 007 |
|  | 2120 | 017 | 036 | 034 | 035 | 030 | 031 | 032 | 013 | 037 | 021 | 022 | 014 | 024 | 025 | 026 | 027 |
| K=3 | 2140 | 000 | 026 | 024 | 025 | 037 | 021 | 022 | 003 | 010 | 036 | 034 | 035 | 030 | 031 | 032 | 013 |
|  | 2160 | 027 | 016 | 014 | 015 | 020 | 011 | 012 | 023 | 017 | 001 | 002 | 024 | 004 | 005 | 006 | 007 |
| K=4 | 2200 | 000 | 006 | 004 | 005 | 017 | 001 | 002 | 035 | 010 | 016 | 014 | 015 | 020 | 011 | 012 | 023 |
|  | 2220 | 007 | 026 | 024 | 025 | 037 | 021 | 022 | 003 | 027 | 036 | 034 | 004 | 030 | 031 | 032 | 013 |
| K=5 | 2240 | 000 | 032 | 030 | 031 | 027 | 036 | 034 | 015 | 010 | 026 | 024 | 025 | 037 | 021 | 022 | 003 |
|  | 2260 | 013 | 006 | 004 | 005 | 017 | 001 | 002 | 035 | 007 | 016 | 014 | 030 | 020 | 011 | 012 | 023 |
| K=6 | 2300 | 000 | 012 | 020 | 011 | 007 | 016 | 014 | 025 | 010 | 006 | 004 | 005 | 017 | 001 | 002 | 035 |
|  | 2320 | 023 | 032 | 030 | 031 | 027 | 036 | 034 | 015 | 013 | 026 | 024 | 020 | 037 | 021 | 022 | 003 | effective Combined Address in Octal ↑

Referring to Table I, it will be seen that the data stored in the ROM 210 comprises seventeen vertical columns which are broken up into a plurality of pairs of horizontal rows. The first vertical column is representative of the beginning octal address for the characters stored in the corresponding row. The remaining vertical columns represent the plain text characters corresponding with the encoded octal numbers in the corresponding column position. For example, referring to the second vertical column, the octal number "000" corresponds to the plain text character NULL. The octal number "020" corresponds to the character T.

Each pair of horizontal rows corresponds to a particular five bit random key word, of which there are a total of thirty-two possible characters. Each of the key characters has been provided with a number from 0–31. For example, key "0" is equal to the five digital bits "00000", while key word "5" is equal to the digital word "00101". Table II is constructed in the identical manner, except plain text data is stored within the columns and rows.

In order to further describe the operation of the ROM 210, it will be assumed that it is desirable to encipher the character "Q" with a random code word number "5". An address signal ID1-ID5 is thus generated to represent the input clear data character "Q". The signal ID5-ID1 would thus comprise the digital word "10111". Similarly, a key word is generated from the random code generator previously described and is applied as signals SK1-SK5 to the ROM 210. In the particular example, the key word number "5" is represented by the digital word "00101". A digital bit "0" is also generated by he circuit to denote it is desired to encipher with the ROM 210.

Thus, the digital word "00010110111", comprising the eleven digits previously described, is applied to the ROM 210. Converting this digital word into octal, beginning with the least significant bit, provides the octal number "0267". Looking for the octal number "0267" in Table I, it will be found that the octal word "004" appears at the intersection of the column corresponding to the character "Q" and the row corresponding to "K-5". Converting the resulting octal number "004" to binary provides the binary number "00000100". The last five bits "00100" correspond to the SPACE character which is the enciphered character which is then output by the system. In operation, the address provided by the signals ID1–ID5 and SK1–SK5 are applied to the ROM 210, the ROM 210 is strobed and the SPACE character would be generated to an output latch.

Utilizing the reverse of the previous example, it will now be assumed that it is desirable to decipher the character SPACE utilizing the key word number "5". The signals ID5–ID1 for the SPACE character comprise "00100". The signals SK1–SK5 for key word number "5", as before is "00101". A "1" bit is generated to denote that it is desired to decipher. The resulting digital word comprises "10010100100". The resulting octal address for this number is "2244". At that address in the data shown in Table II, the stored plain text data is "027". The resulting binary number for the octal number "027" is "00010111". The last five bits "10111" correspond to the character "Q". The character "Q" is then output by the ROM 210 as the clear text word corresponding to the encoded character.

Data Switching Circuit

FIG. 11 also illustrates the data circuitry which selects the routing of the data paths within the system. The two main data paths are the printer data and the transmit line data. The receive data, labeled RXRAW, and the keyboard data, labeled KBRAW, are also routed through the data switching circuitry. The primary influence on the selection and routing of the data is the mode of operation indicated by the three signals OFFLINE, ASYN, SHD. These signals denote the three basic operating modes of the system and are applied to control the printer data select 239 and the transmit data select 241.

Each of the lines PRDAT and TXDAT can be forced to a logical "0" by the actuation of the BREAK switch as indicated by the signal BREAKSW applied to the alarm inhibit and break circuits 246 and 248. Both can be forced to a logical "1" or marking condition by the occurrence of an alarm condition.

The printer inhibit 240 and keyboard inhibit 242 circuits are activated when a local half-duplex teleprinter is used. When employing a half-duplex teleprinter, the KY and PR ports must be connected in series. For this reason, it is necessary to inhibit the printer data when the keyboard is active. It is also essential that the keyboard circuit be inhibited when the receive data is active. Likewise, the receive data inhibit 244 inhibits the RX data port whenever a signal is being transmitted in the two-wire line configuration. When the two-wire or half-duplex line is used, the RX and TX ports must be connected in series. To prevent the outgoing character from being reflected back into the RX port, the receive data inhibit 244 blocks out the RX port for one character time.

The probe test logic 250 is for diagnostic purposes and allows the printer data to be connected to the PROBE test point. The space generator circuit 252 is used to provide the space (SP) character supplied by the printer when the receive prime is being loaded into the key generator. The timing and control circuitry 254 is used for timing of the data switching circuitry while the timing circuitry 256 is used primarily to aid in the control of the digital correlator during the SYN HD mode.

Main Controller

Figure 12:
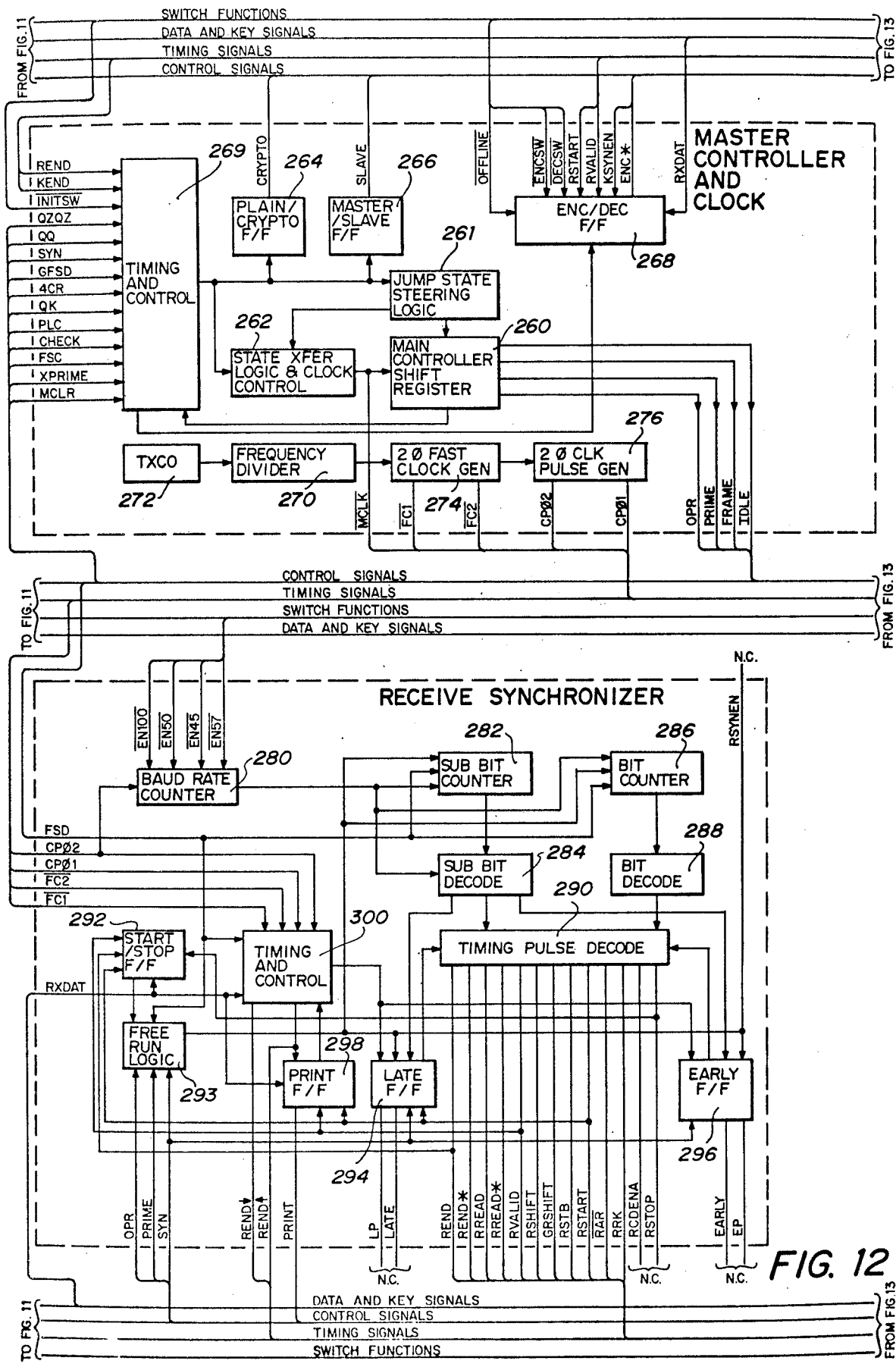
FIG. 12 is a block diagram of the master controller and clock and receive synchronizer of the invention.

FIG. 12 illustrates the main controller circuit which provides two primary functions. It generates all of the control sequences that determine the state of the system, as well as generating all of the clock signals for the timing. The heart of the controller consists of the shift register 260. The four states of the machine are IDLE, FRAME, PRIME and OPR. The IDDLE mode indicates that the system has not yet initiated a priming sequence.

In the off-line and asynchronous mode, the IDLE mode means that the plain-to-crypto sequence has not been encountered or the crypto-to-plain sequence has returned the machine to the IDLE state. The normal next state from IDLE is the PRIME state. This state causes the system to either generate or accept priming information either to or from the key generator. The OPR, or operate state, denotes that the system is actually enciphering or deciphering a message. The fourth state FRAME, is entered only in the SYN HD mode and denotes that the system is sending the frame sync pattern.

The controller is initiated by the power on preset or the ALARM RESET button to the IDLE state. From this point, the normal sequence of states, IDLE, FRAME, PRIME and OPR, are actuated by the state transfer logic and clock control circuitry 262. This logic consists of merely shifting the "1" bit set in the shift register 260 to the next state when a sequential state transfer occurs. However, if a jump state is required, the controller register 260 must be preset to the new state by the jump state steering logic 261.

Several sub-control functions are also contained in the master controller circuitry. The plain/crypto flip-flop 264 determines whether or not the system is to encipher a particular message or pass it unciphered. The flipflop 264 is set and reset by the control sequences.

The master/slave flipflop 266 is affected only during the SYN HD mode. If the operator presses the INITIATE switch or types the sequence QZQZ to initiate the framing and priming sequence, the flipflop 266 will be reset to indicate that the machine is a master. If the frame sync pattern has been received and detected by the correlator circuit, flipflop 266 will be set to indicate that the unit is a slave.

The ENC/DEC flipflop 268 denotes whether the machine is enciphering or deciphering. When off-line, the flipflop 268 is directly set or reset by the ENCIPHER and DECIPHER switches respectively. However, in the on-line modes (ASYN or SYN HD), the flipflop 268 is set under the control of the keyboard synchronizer and the receive synchronizer, to be later described. Timing is provided by timing and control circuitry 269.

All of the timing signals and clock pulses for the entire system are generated by a frequency divider 270, which divides the highly stable temperature compensated crystal oscillator (TCXO) 272. The output of this divider is fed into two two-phase clock generator circuits 274 and 276. Circuit 274 generates the high speed clocks $\overline{FC1}$ and $\overline{FC2}$ and the circuit 276 generates a slower speed two-phase clock labeled CP$\phi$1 and CP$\phi$2.

Receive Synchroniser

FIG. 12 also illustrates the receive synchronizer. This synchronizer is almost identical to the output and keyboard synchronizers subsequently shown in FIGS. 13 and 14. The three synchronizers provide the timing necessary for data handling and transfer, as well as register loading and control. All three synchronizers operate in basically the same manner. The only differences in operation are the signals which control the synchronizers, the clock which drives them, and the number of timing signals derived. The keyboard synchronizer (FIG. 14) controls the handling of the data entered from the keyboard. In the off-line and asynchronous modes, the synchronizer operates in a start/stop fashion and is actuated by the data from the keyboard. In the SYN HD mode, the keyboard synchronizer also operates in the free-run mode temporarily while the frame sync pattern and priming data are being transmitted.

The output synchronizer (FIG. 13) controls the output of the system, either to the line or the local printer. In the off-line and asynchronous modes, the output synchronizer operates in start/stop fashion and is actuated by the KEND pulse from the keyboard synchronizer. IN the SYN HD mode, the output synchronizer operates in the free-run mode as soon as the priming information has been transmitted. The output synchronizer controls the key generator in the SYN HD mode if the machine is a master.

The receive synchronizer shown in FIG. 12 controls the handling of the data from the RX port in either of the online modes. In the asynchronous mode, the synchronizer operates in start/stop fashion and is activated by the received data, RXDAT. In the SYN HD mode, the synchronizer free-runs as soon as the correlator recognizes the frame sync pattern from the sending unit.

In a slave machine, the receive synchronizer controls the key generator. The only time the receive synchronizer is active in a master unit is when the LINE switch is set to FD. The unit is then expecting a response from the slave unit so that synchronization can be established simultaneously in both directions.. In this situation, the receive synchronizer does not control the key generator, but does control the output of the key words stored in the key FIFO register 186 (FIG. 10).

As shown in FIG. 12, the clock labeled CP$\phi$2 is divided by a multi-modulus baud rate counter 280, to provide a clock signal equal to 16 times the baud rate. The amount by which the baud rate counter 280 divides the CP$\phi$2 signal depends upon the baud rate selected on the BAUD RATE switch located on the power supply module. The output of this switch is indicated by the signals $\overline{EN45}$, $\overline{EN50}$, EN57 and $\overline{EN100}$. The output of the baud rate counter 280 is further divided by a sub-bit counter 282 and decoded by decode 284 to provide timing signals equal to 1/16 of a bit period. The signal is further divided by the bit counter 286 and decoded by decode 288 to provide timing signals which correspond to each individual bit of the data character. Both of these decode circuits are further decoded by decode 290 to provide all of the timing pulses necessary to operate the system.

In both the off-line and asynchronous on-line modes, the receive synchronizer is enabled by the appearance of a start bit on the RXDAT signal as controlled by the start/stop flipflop 292. The synchronizer is enabled and all of the timing pulses are generated until the REND pulse is generated which resets the start/stop flipflop 292. The synchronizer is then idle until the next start bit occurs on the RXDAT line. The receive synchronizer free-runs during certain modes of operation. This free-running nature of the receive synchronizer is controlled by the free-run logic 293 and is governed by the signals SYN, PRIME and OPR.

An additional feature of the receive synchronizer is the late flipflop 294 and the early flipflop 296. Whenever the synchronizer is free-running its effective baud length is exactly 6.75. When the start bit from the RXDAT line perfectly coincides with the start bit within the synchronizer, neither the late nor the early flipflop will be set. However, should the data and the synchronizer drift slightly, either of these flipflops 294 and 296 will be set, depending on the direction of the drift. Appropriate action is taken within the decode timing pulse logic 290 to correct the synchronizer to keep it aligned with the incoming data. This constitutes a digital phase-lock loop which keeps the receive synchronizer fine tuned to the incoming RXDAT signal. As long as the RXDAT signal is present, the receive synchronizer should be able to track the incoming data as long as the slew rate is not more than 1/16 of a bit per character. The capture range of the digital phase lock loop is plus or minus one-half bit.

A final feature of the receive synchronizer is the print flipflop 298 which determines if an incoming character had a start bit in the proper location. If not, the print flipflop 298 will be reset and the corresponding character will not be deciphered and applied to the printer. This prevents unwanted characters from eing printed which were generated by noise on the line thus creating false characters. Timing for the receive synchronizer is provided by the timing and control circuit 300.

Output Synchronizer

Figure 13:
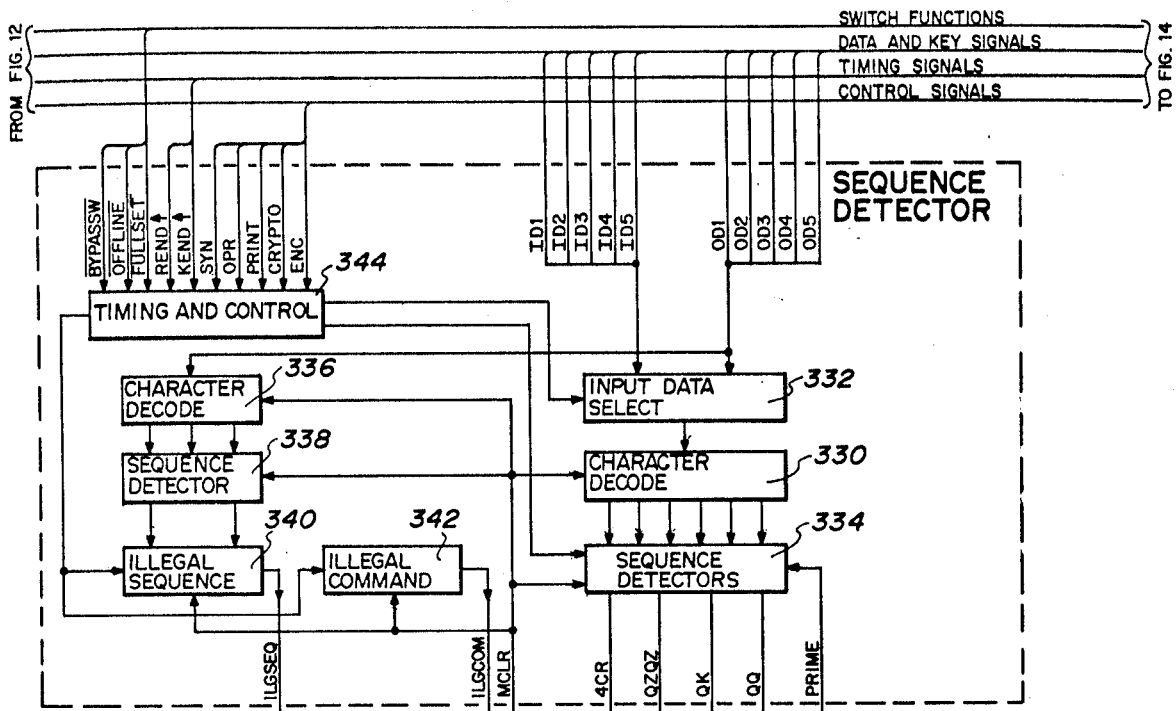
FIG. 13 is a block diagram of the sequence detector and output synchronizer of the invention.
Figure 13:
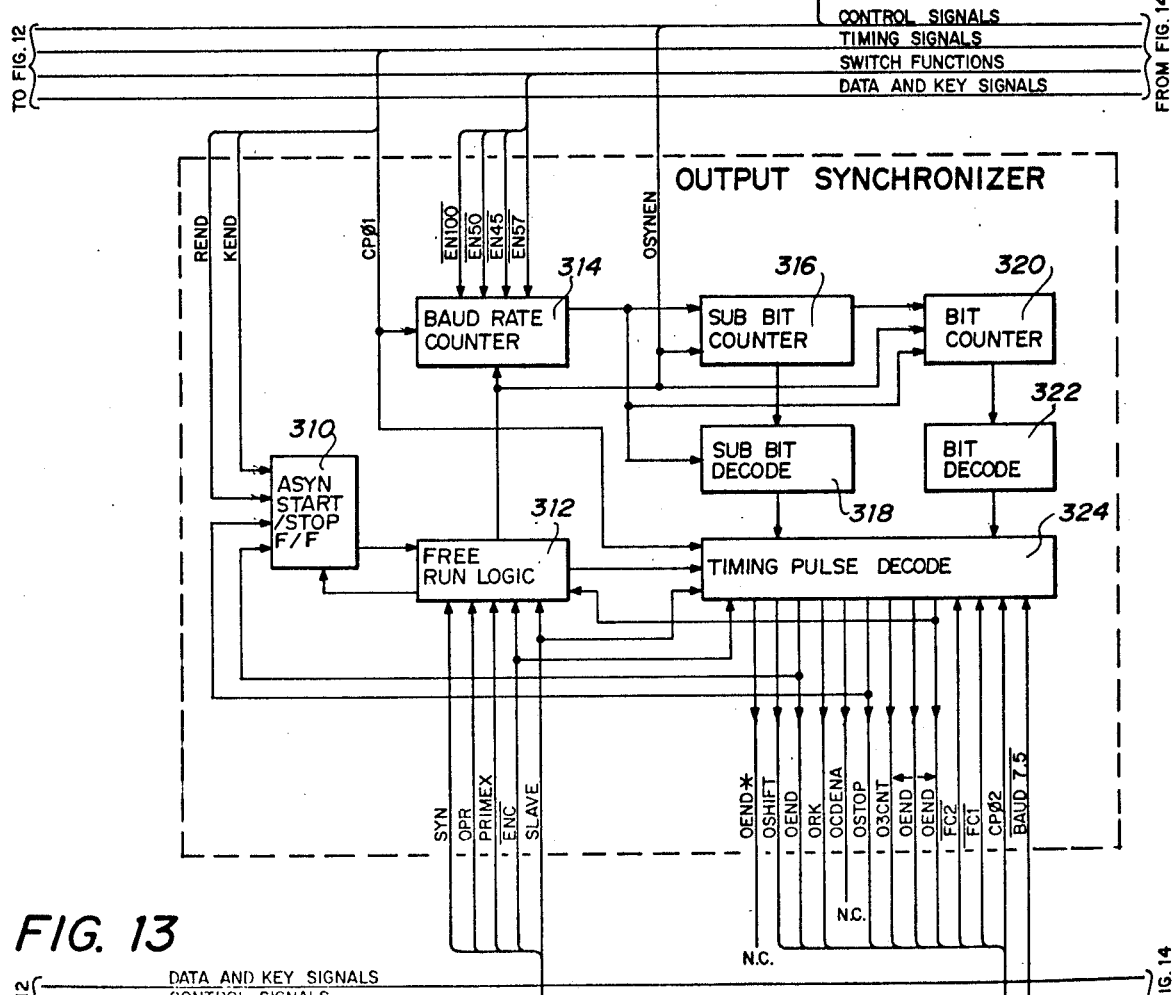

FIG. 13 illustrates the output synchronizer which controls the output of the system, either to the line or to the local printer. In the off-line and asynchronous modes, the output synchronizer operates in start/stop fashion and is actuated by the KEND pulse applied from the keyboard synchronizer to the asynchronous start/stop flipflop 310. When a character is entered, the keyboard synchronizer shifts the character into the KY register 198 (FIG. 10) and loads the enciphered character into the data FIFO buffer 230 (FIG. 11). The output synchronizer is then activated to provide the timing to shift the character out from the data FIFO buffer 230 to the line or printer. In the SYN HD mode, the output synchronizer shown in FIG. 13 operates in the free-running mode by operation of the free-run logic 312, as soon as the priming information has been transmitted. The output synchronizer controls the key generator in the SYN HD mode if the machine is operating as a master.

The clock signal CP$\phi$1 is divided by a multi-modulus baud rate counter 314, in dependence upon the baud rate selected by the baud rate switch located on the power supply module. The output of counter 314 is further divided by a sub-bit counter 316 which is decoded by a sub-bit decode circuit 318. The clock signal is further divided by a bit counter 320 which is decoded by a bit decode 322 to provide timing signals corresponding to each individual bit of the data character. Both of the decode circuits are further decoded by a timing pulse decode 324 to provide the timing pulses necessary to operate the circuit.

Sequence Detector

FIG. 13 also illustrates a sequence detector circuit which is used to detect the control characters required to switch the system from the plain to crypto and from crypto to plain. Each of these characters is decoded by the character decode 330 from either the input data labeled ID1 through ID5 or the output data, OD1 through OD5. This selection is made by select circuit 332 and is dependent primarily upon whether or not the machine is enciphering or deciphering. Once the data has been selected by select 332 it is applied to the character decode logic 330, where the six required characters are decoded and applied to the sequence detectors 334. The sequence detector generates four signals labeled 4 CR, QZQZ, QK and QQ. These represent the four sequences used to control the system.

In addition, another character decode 336 and a sequence detector 338 are constantly monitoring the cipher text (OD1 through OD5) to determine if the sequences NNNN or ZCZC have occurred. Both of these sequences are invalid as data in the Telex network. Should either of these signals occur during the enciphering of a message in the Telex mode, either off-line or in the asynchronous on-line mode, an illegal sequence (ILGSEQ) signal will be generated by sequence circuit 340 and result in an alarm condition. Likewise an illegal command situation can be encountered whenever the system is commanded to switch to the crypto mode when it is already in the crypto mode. This can occur only in the off-line or asynchronous mode. When the system is in the SYN HD mode, it is always in crypto and no sequences are required. Illegal commands are detected by detector 342 to generate the signal ILGCOM. Timing and control of the circuit is provided by timing and control 344.

Keyboard Synchronizer

Figure 14:
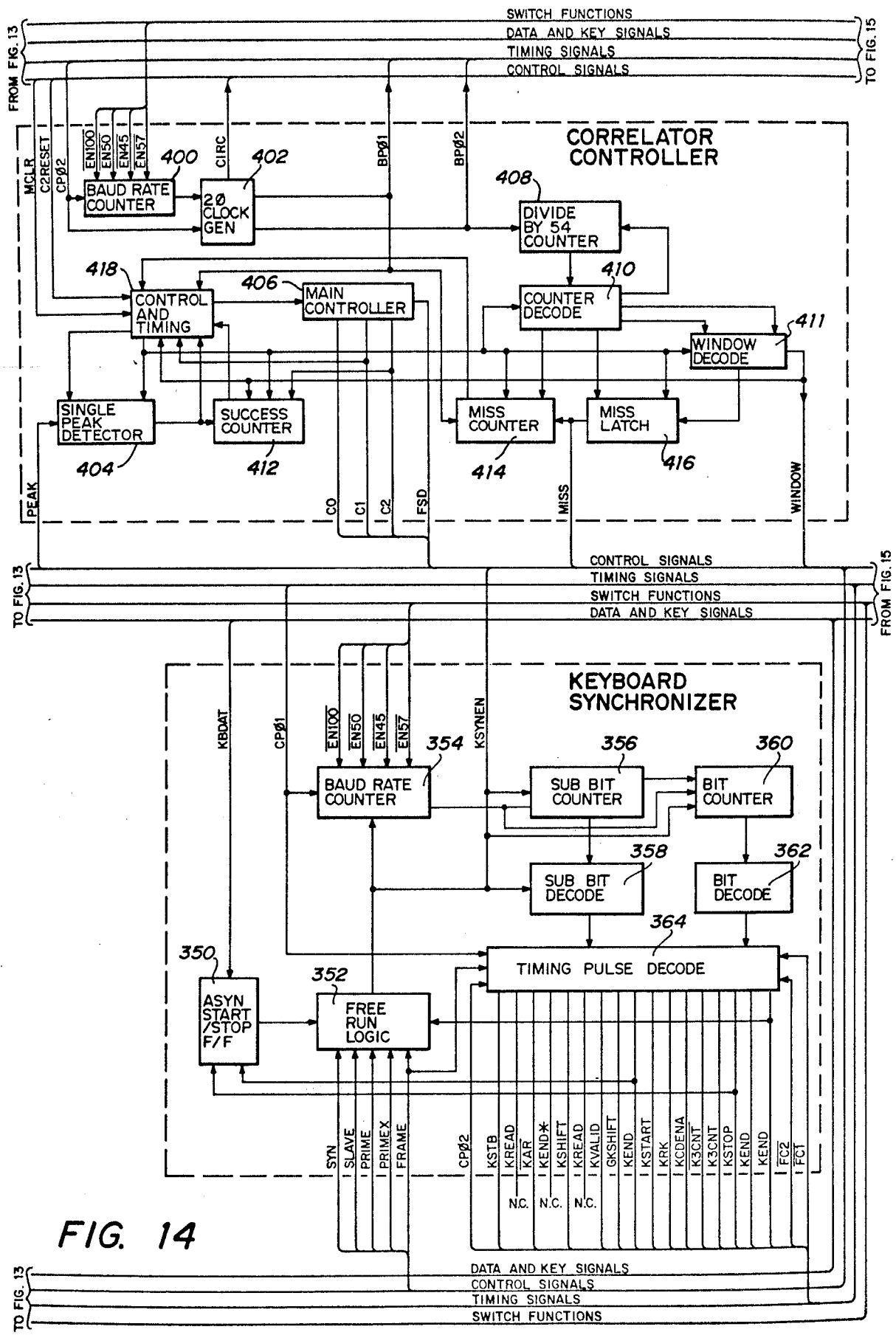
FIG. 14 is a block diagram of the correlator controller and the keyboard synchronizer of the invention.

FIG. 14 illustrates the keyboard synchronizer which controls the handling of the data entered from the keyboard. This synchronizer operates in the start/stop fashion in the off-line and asynchronous modes, and is actuated by the data from the keyboard. In the SYN HD mode, the keyboard synchronizer operates in the free-running mode temporarily while the frame sync pattern and priming data are being transmitted.

Referring to FIG. 14, the asynchronous start/stop flipflop 350 is actuated by the keyboard data KBDAT in order to start and stop operation of the keyboard synchronizer. During the SYN HD mode, the free-run logic 352 is actuated in order to place the system in the free-running mode. The CPφ1 clock is applied to a baud rate counter 354 which divides the signal in dependence upon the selection of the baud rate switch located in the power supply module. The output of the counter 354 is further divided by a sub-bit counter 356, the output of which is decoded by a sub-bit decode 358. The output of counter 354 is also further divided by a bit counter 360, the output of which is decoded by a bit decode 362. The output of decodes 358 and 362 are further decoded by a timing pulse decode 364 in order to generate timing pulses for operation of the system.

It will thus be seen that the receive synchronizer, output synchronizer and keyboard synchronizer operate in conjunction with one another in the different modes of operation of the system. In the asynchronous mode, the receive synchronizer is connected in an asynchronous configuration to receive enciphered digital data from a communications channel and to direct the enciphered digital data to the deciphering circuitry. In this mode, the output synchronizer is connected in an asynchronous configuration to the output of the deciphering circuitry to direct the deciphered digital data to the printer. When it is desired to encipher plain text data in the asynchronous mode, the digital characters are clocked in by the keyboard synchronizer to the enciphering circuitry. The output synchronizer is operable in an asynchronous configuration such that the enciphered digital characters are asynchronously shifted to the communications channel in an on-line configuration, or to the printer in an off-line configuration.

In the synchronous mode, the keyboard synchronizer clocks in the digital characters from the keyboard. The digital characters are enciphered, and the output synchronizer is connected in a free-running synchronous mode to synchronously shift the enciphered digital characters to the communications channel. In the receive on-line synchronous mode, the receive synchronizer is connected in a synchronous free-running configuration to synchronously receive enciphered data from the communications channel. The receive synchronizer then synchronously directs the enciphered digital data to the deciphering circuitry. The output synchronizer is connected in a synchronous mode to the output of the deciphering circuitry to synchronously direct the deciphered digital data to the printer.

Correlator Controller and Correlator

Figure 15:
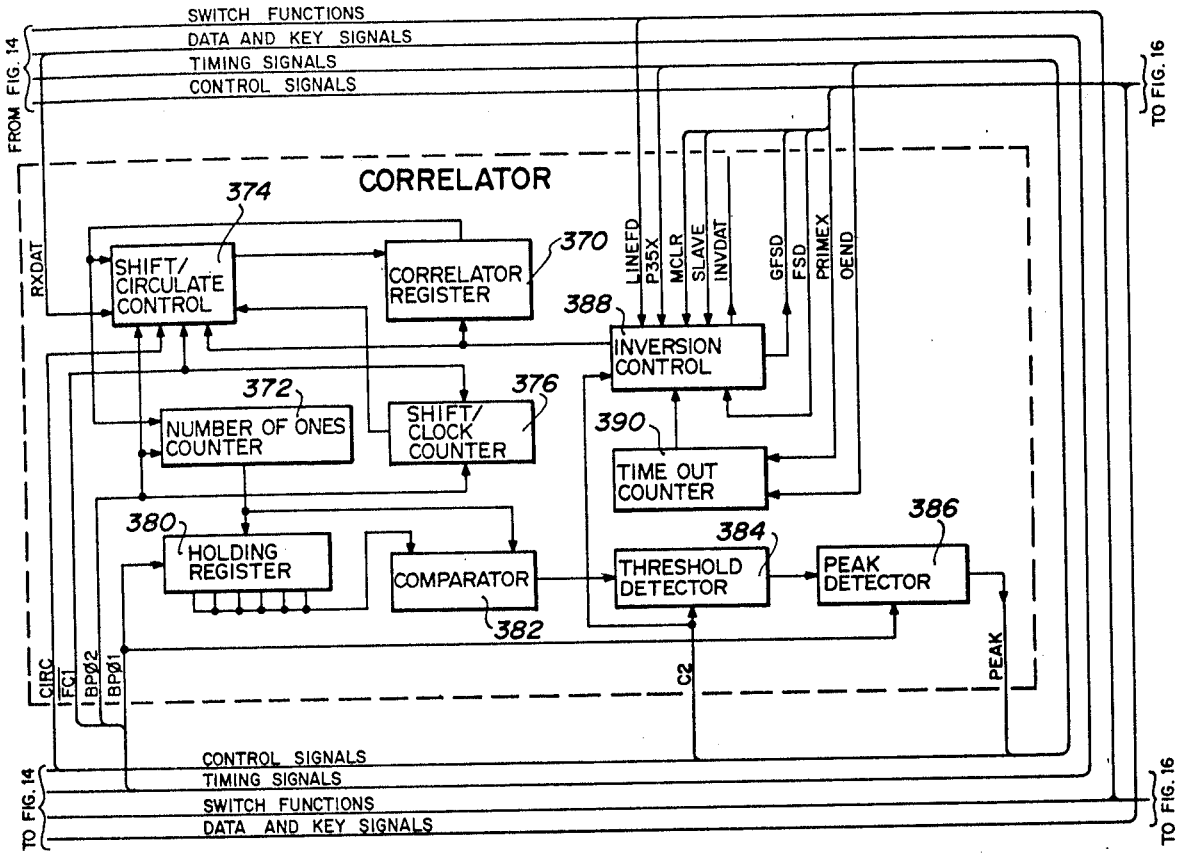
FIG. 15 is a block diagram of the correlator of the invention.

The correlator controller shown in FIG. 14 operates with the correlator shown in FIG. 15 to recognize the frame sync pattern sent from the master to the slave unit in the SYN HD mode. A correlation technique is used to recognize the frame sync pattern. The actual correlation is done in the circuitry shown in FIG. 15, while the control, timing and counting circuitry which accompanies the correlator is shown in FIG. 14.

The correlation pattern consists of 15 characters. The Baudot character with the best cross correlation properties is the character "B". The frame sync pattern thus consists of three inverse B's, followed by eleven normal character B's, followed by one final inverted B ($\overline{B}$) character. The inverted $\overline{B}$ is truly the inverse of the normal character B, including the start and stop bits which have also been inverted. This is required to give a true inverse correlation pattern.

Each character, B or $\overline{B}$, is to be recognized by the correlation circuitry shown in FIG. 15 and a correlation pulse shown as PEAK is generated. If a correct number of peaks occur consecutively, frame sync will be established. The first three $\overline{B}$ characters are for preconditioning the correlator. This is to ensure that the correlator is in an initial state of C0. If nine out of the following eleven B patterns are detected, the correlator begins looking for the inverse pattern $\overline{B}$. This is accomplished by inverting the input to the correlator register. Once the final $\overline{B}$ pattern has been recognized, the frame sync detect signal FSD will be generated and the system will immediately become the slave unit and start accepting the incoming prime which follows immediately.

The method of determining whether or not the correlation pattern has occurred is by sampling the incoming data, RXDAT, at eight times the bit rate. Referring to FIG. 15, each of these samples is accumulated in a 54-bit shift register 370 in such a fashion that if the proper correlation character (B or $\overline{B}$) has occurred, the shift register 370 will contain 54 one's. The number of one's in the shift register 370 is determined by the number of one's counter 372. The shift register can be instructed to act as an end-around shift register by the control signal CIRC which is applied to a shift/circulate control 374 to cause the shift register 370 to circulate its contents. If the signal CIRC is a logical "0", the shift register 370 is configured to accept a new sample. After each sample, the shift register 370 configures itself as a circulating shift register and is clocked 54 times to complete one revolution of the contents. As the contents are being circulated at high speed the number of one's contained in the register is accumulated in the number of one's counter 372.

The shift/clock counter 376 controls the shifting of the correlator register 370. Register 370 has a modulus of 54. After each circulation, the contents of the number of one's counter 372 is transferred in parallel to the holding register 380. The output of the holding register 380 as well as the output of the number of one's counter is fed into a comparator 382 and the threshold detector 384.

The threshold detector determines if the number of one's contained in the holding register represents the number 48 or greater. Any number larger than 48 constitutes the penetration of the arbitrary threshold set by the correlator.

In order to refine more precisely the exact point at which the correlator has reached its peak, it is necessary to find the first negative transition of the contents of the holding register 380. Thus, a comparator 382 compares the contents of the holding register 380, which comprises the contents of the previous sampling of the correlator register 370, with that of the present results of the correlator held in the number of one's counter 372. This comparison determines when the first negative going value has occurred. Therefore, a threshold detector 384 generates an output if the threshold has been penetrated and the subsequent reading indicates a value less than the prior value.

Once the threshold output is applied to a peak detector 386, the next clock BP$\phi$1 will cause a peak signal to be generated. This signal is used on the correlator controller circuit shown in FIG. 14, to try to establish the occurrence of frame sync. The correlator merely detects the occurrence of one single character pattern. It is up to the correlator controller to determine whether enough patterns have occurred consecutively followed by the inverse pattern to establish correct frame sync.

Another feature of the correlator is the inversion control 388. This control inverts the input to the correlator register 370 when the correlator is inverted when SYN HD mode is used and the LINE switch is set to FD. In this particular mode of operation, the master unit is expecting a response from the slave unit. The response from the slave is exactly inverse from that of a normal frame sync detect pattern. For this reason, when the master unit is initiating its frame sync pattern it instructs its correlator to look for an inverse pattern from the slave.

If the inverse pattern from the slave has not occurred within a specified interval of time (approximately 8 characters in duration), the time-out counter 390 will restore the correlator back to its normal mode of operation.

The correlator controller shown in FIG. 14 contains most of the timing required to drive the correlator. The rate at which the correlator operates of course is dependent upon the baud rate being used. The baud rate counter 400 divides the basic clock CP$\phi$2 by the correct amount to provide the input to the two-phase clock generator 402. Clock generator 402 establishes the CIRC signal and the two phase clocks labeled BP$\phi$1 and BP$\phi$2 which drive the correlator. The frequency of this two-phase clock must be exactly 8 times the baud rate. The baud rate counter 400 is controlled by the BAUD RATE switch located on the power supply module and is denoted by the four lines $\overline{\text{EN45}}$, $\overline{\text{EN50}}$, $\overline{\text{EN57}}$ and $\overline{\text{EN100}}$.

The signal, PEAK, is first applied from the correlator shown in FIG. 15 to the single peak detector 404 to remove all but the first peak from the correlator circuit. Often more than one peak can occur from the threshold and peak circuit of the correlator circuit.

Before a peak has occurred, the main controller 406 is in state C0. This state denotes that the correlator is looking for its initial pattern. Once the first peak has been detected, the main controller transfers to state C1, which starts looking for successive peaks at the proper time.

Once state C1 has been entered, the divide by 54 counter 408 starts incrementing. The output of this counter 408 is decoded by counter decode 410 to establish the timing between the present peak and the next peak. If the peak that occurred was in the first of a series of correlation patterns, the next peak should fall within a specified timing window. This window is determined by the window decode circuit 411. Thus, after the first peak has been detected and the main controller 406 has switches to state C1, another peak is expected to occur within a certain time frame; namely 54 clock pulses later.

If a subsequent peak does occur within the specified time limit, the success counter 412 is incremented. If a peak fails to occur within the specified time, the miss counter 414 is incremented. A miss latch 416 is responsive to the window decode 411 to latch counter 414. Timing is provided to the circuitry by control and timing 418.

Using these two counters, the strategy of obtaining nine successes before three misses have occurred, will cause the main controller 406 to switch to state C2. Once the controller is in state C2, the correlator is then inverted and starts searching for the final $\overline{B}$ pattern. Since the correlator is inverted, the $\overline{B}$ pattern will also cause a peak to be generated and a peak in state C2 is gated out of the main controller 406 to form the signal, FSD denoting frame sync detect. If during the control sequence three misses occur, the correlator is immediately transferred back to state C0 to begin its search for a new pattern.

Power Supply

Figure 16:
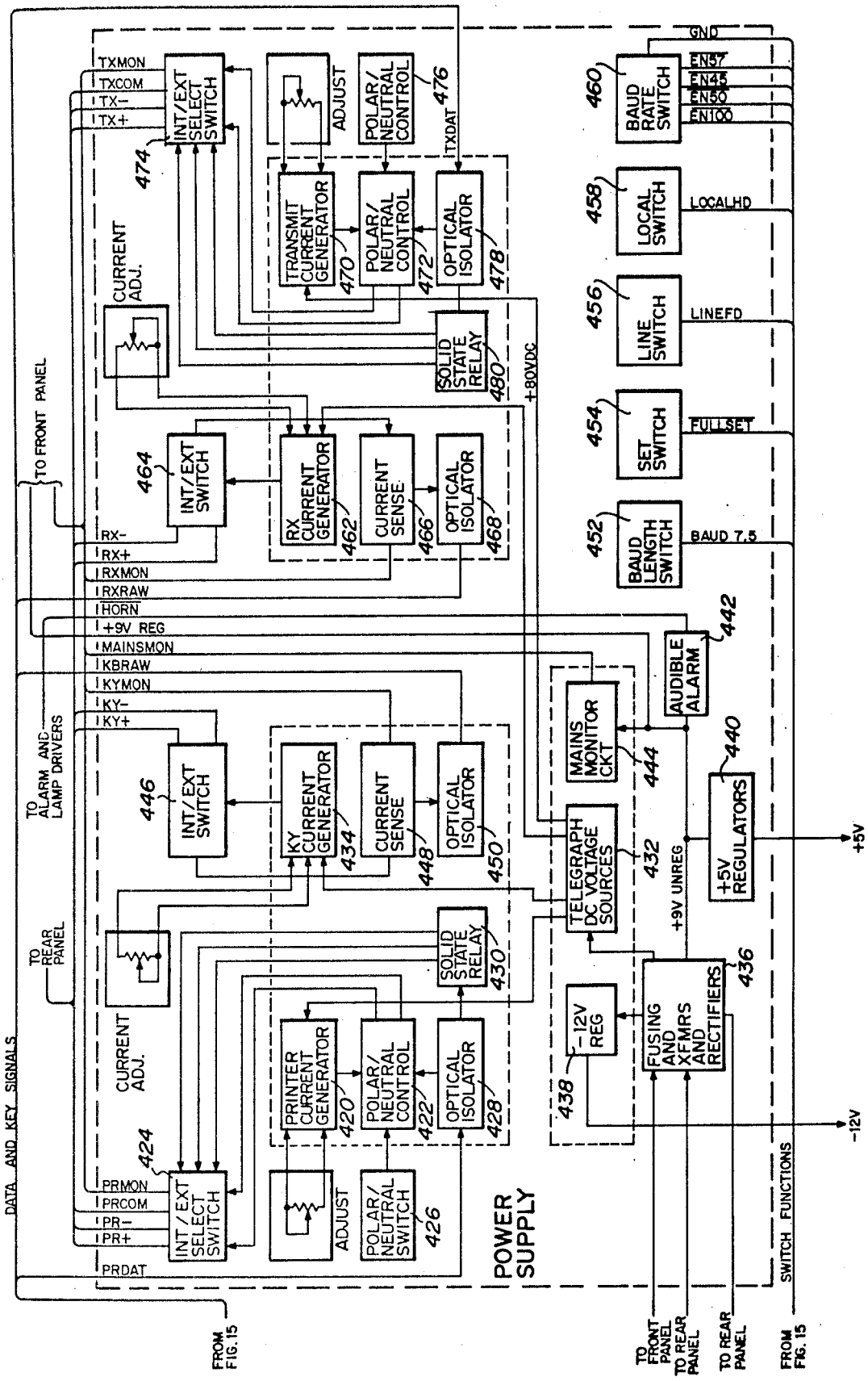
FIG. 16 is a block diagram of the power supply of the invention.

FIG. 16 illustrates in block diagram form the power supply of the present system. The printer current generator 420 is connected through a polar-neutral control 422 to an internal/external select switch 424. A polar-neutral switch 426 is connected to the polar-neutral control 422. An optical isolator 428 receives PRDAT signals from the system logic and controls the solid state relay 430 and the polar/neutral control 422. The optical isolator provides electrical isolation between the system and the telegraphic circuits provided by the solid state relay 430 or the polar/neutral control 422. The telegraph DC voltage source 432 is applied to the printer current generator 420 and also to the KY current generator 434. The fusing transformers and rectifiers 436 are connected to the front and rear panels and are connected to the voltage sources 432. A minus 12 volt regulator 438 is connected to generate a regulated negative voltage. A plus 5 volt regulator 440 is connected to generate a regulated positive voltage. An audible alarm 442 is connected to sound an alarm in response to the HORN signal. The mains monitor circuit 444 generates the MAINSMON signal.

The KY current generator 434 is connected to an internal/external switch 446 which is interconnected with a current sensor 448, the output of which is applied to an optical isolator 450 for generation of the KBRAW signal. The baud length switch 452 is located on the power supply module to generate the baud length switch function previously described. Similarly, a set switch 454, line switch 456 and local switch 458 are located on the power supply module for generation of switch functions. A baud rate switch 460 is provided to enable the selection of the desired baud rate in the manner previously described.

The telegraph DC voltage source 432 is further connected to an RX current generator 462 which is connected through internal/external switches 464. A current sensor 466 senses the current in the switch 464 and applies an RXMON signal to the meter on the front panel. The optical isolator provides electrical isolation between the RX telegraphic loop and the logic signal RXDAT. The DC voltage source 432 is also connected to a transmit current generator 470, the output of which is applied through a polar/neutral control 472 which is connected to an internal/external select switch 474. The polar/neutral switch 476 controls the control circuit 472. The TXDAT signal is applied through an optical isolator 478 to control the solid state switch 480 which provides input to the select switch 474.

Prime Data Schematic

Figure 17:
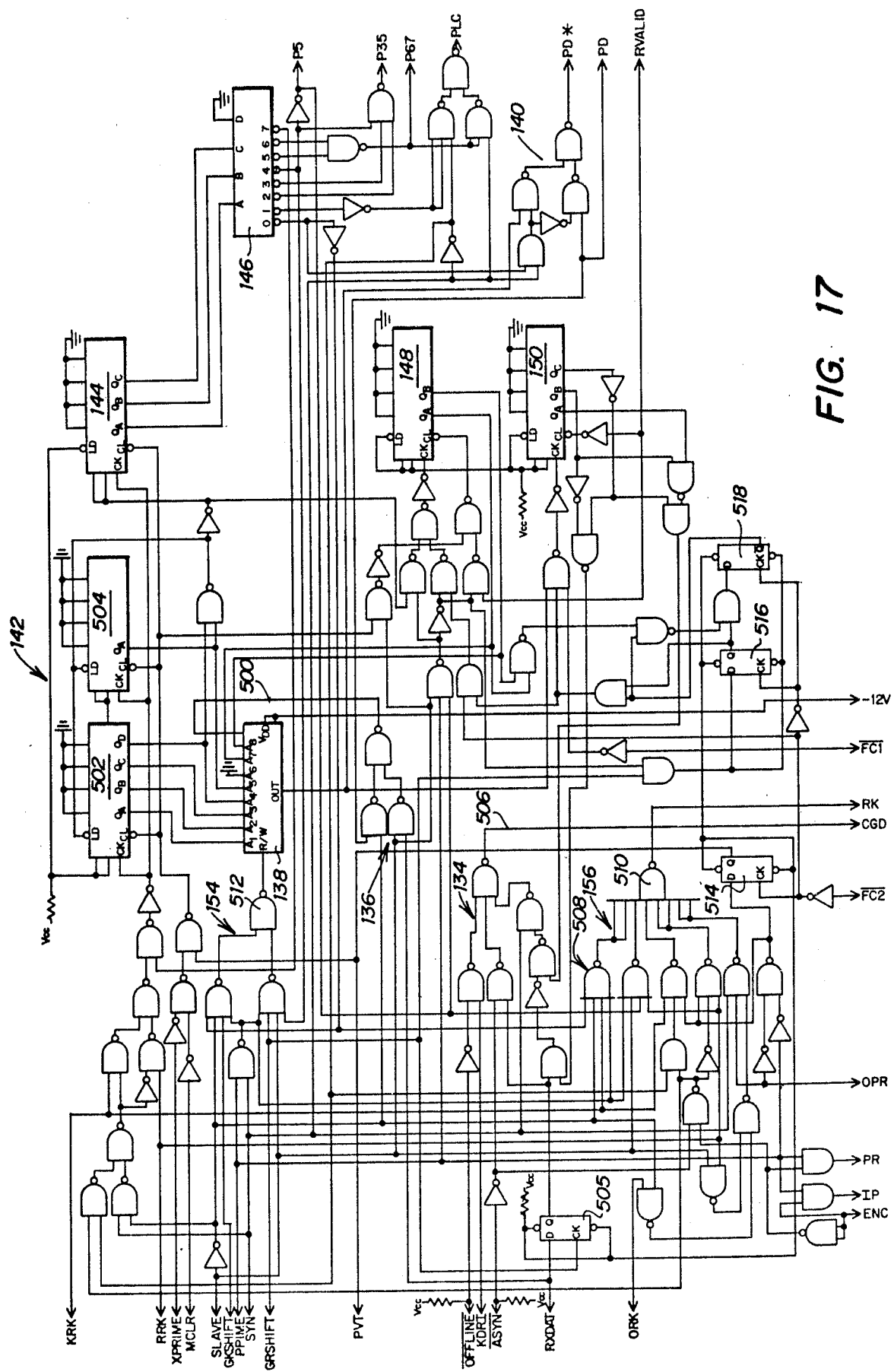
FIG. 17 is a schematic diagram of the prime data circuit of the invention.

FIG. 17 illustrates in schematic detail the prime data circuitry shown in block form in FIG. 9. Like numbers will be utilized for like and corresponding circuitry in FIGS. 9 and 17. As previously noted, the purpose of the prime data circuit is the accumulation, checking and transmission of the five random priming characters that preceed each enciphered transmission.

When the prime state is entered in the synchronous mode, the key generator is requested to deliver 25 bits of random priming information (5 characters) to the RAM input select circuitry 136, which comprises the illustrated NAND gate configuration. The PD (priming data) is then applied via lead 500 to the input of the random access memory (RAM) 138 for storage. RAM 138 may comprise, for example, a MK4007P RAM. The prime is then retransmitted four additional times from the RAM 138 through the transmit prime control 140, which comprises a series of NAND gates as illustrated.

The output of the transmit prime control 140 is applied to the controller as the signal PD*. This results in the transmission of prime five times and allows the receiving unit to make the previously described three-out-of-five decision as to the correct reception of prime.

The prime bit counter 142 includes two counters 502 and 504 connected in the manner illustrated to keep track of which bit of prime is being generated and to provide the address for the RAM 138. The prime repeat counter 144 is connected to keep track of how many times the 25 bits of prime have been transmitted by the RAM 138. Counter 144 is decoded by the prime repeat decode circuit 146 which generates signals such as P5 to indicate the fifth transmission of the prime information. Decode circuit 146 may comprise, for example, a 74LS42 decoder.

When in the receiving sequence in the synchronous half-duplex mode (SYN HD), the first four priming sequences are stored in the RAM 138. As the fifth priming sequence is being entered, the address scan circuitry 148, which may comprise a 74LS161 counter circuit, rapidly accesses the corresponding bits from the first four priming sequences.

A counter circuit 150 is interconnected to perform a three-out-of-five vote to determine what the five correct priming bits should be. Once this decision has been made, the three-out-of-five priming voting circuitry 150 routes the results to the receive prime control 134 which generates the signal CGD via lead 506 for loading into the key generator as valid priming information. The receive prime control 134 comprises a plurality of NAND gates interconnected to receive the OFF-LINE and KDRI signals, as well as timing signals from the timing and control circuitry. The RXDAT signal is applied to a D-flipflop 505 which is connected to the receive prime control circuitry 134 in order to provide control thereto.

The prime is transmitted in its entirety (25 bits) and then repeated four times to prevent improper detection due to bust errors. This is termed serrated transmission of prime and allows the loss of as many as ten consecutive characters within the priming sequence before prime is lost to the system.

The prime data circuit is also utilized to generate the request for key (RK) for the code generator. The request for key signal is generated by the request for key logic 156 which comprises five multi-input NAND gates 508 which apply inputs to a multi-input NAND gate 510. The output of NAND gate 510 generates the RK signal. The request for key (RK) logic 156 determines which of the three synchronizers has control at the present and generates the RK signal at the proper time.

The control of the RAM 138 is provided by the read/write control circuitry 154 which includes two multi-input NAND gates having outputs applied to a NAND gate 512 for control of the read and write functions of the RAM 138. The NAND gates of the read/write control circuit 154 are responsive to a plurality of timing and control signals, as well as the GKSHIFT and GRSHIFT signals.

The remainder of the prime data circuitry shown in FIG. 17 comprises the timing and control circuitry which is responsive to various clocking signals such as $\overline{FC1}$ and $\overline{FC2}$ in order to generate timing control signals for the circuitry. For example, the FC2 clock signal is applied to a D-flipflop 514 which is interconnected with a D-flipflop 516. The $\overline{FC2}$ signal thus clocks flipflops 514 and 516, in addition to a D-flipflop 518, in order to generate various portions of the timing signals.

Scrambler I Schematic

Figure 18:
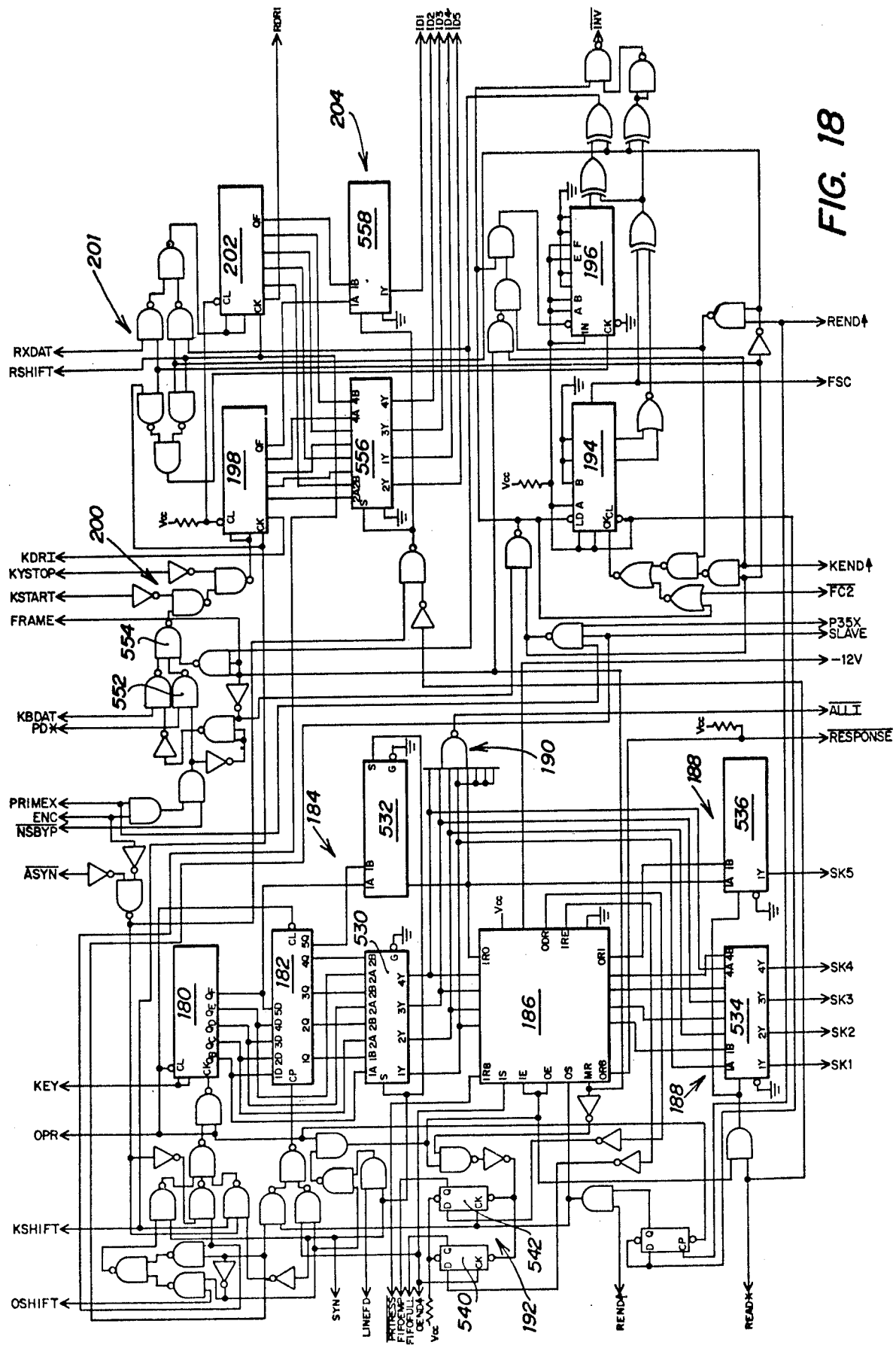
FIG. 18 is a schematic diagram of the Scrambler I circuit of the invention.

FIG. 18 illustrates in schematic detail the circuitry of the Scrambler I circuit previously shown in block diagram form in FIG. 10. Again, like numerals are utilized for like and corresponding parts between the two figures.

As previously noted, the Scrambler I circuit contains most of the key word handling circuitry. As the key is requested by the prime data circuit shown in FIG. 17, the key is accumulated serially in the key word register 180, which may comprise for example a 74LS164 register. In the synchronous mode, it is necessary to hold the key in the key holding register 182, which may comprise for example, a 74LS174 register. The key holding register 182 enables the key to be synchronized with the data which can be entered from the keyboard in an asynchronous fashion.

In both the off-line and synchronous modes, the random key is accumulated in the key word register 180 and then routed in parallel through the key FIFO input select circuitry 184 which comprises select circuits 530 and 532, which may comprise for example 74LS157 select circuits. The key is then routed around the key FIFO register 186 and out through the key select circuitry 188 which includes select circuits 534 and 536. Select circuits 534 and 536 may comprise, for example, 74LS157 select circuits. A selected random five bit key word appears in parallel from the select circuits 534 and 536 as signals SK1-SK5.

In the synchronous mode, the key is accumulated in the key word register 180 and transferred in parallel into the key holding register 182. It is then routed through the key FIFO select circuitry 184 to the key FIFO register 186. The key FIFO register 186 may comprise, for example, an FR1502E first in-first out register. The key FIFO register holds the key generated in storage so it may automatically compensate for transmission delays encountered through the channel when cryptographic synchronization is to be established in both directions simultaneously.

The signals labeled $\overline{\text{PRTRESS}}$ and $\overline{\text{RESPONSE}}$ are applied directly to and taken from the key FIFO buffer 186 respectively in order to enable the system to establish the correct time at which the response from the slave unit should be printed.

The all one's detect circuit 190 comprises a multi-input NAND gate which determines when the key accumulated in the key word register 180 is in the "all one's condition". It is utilized in the alarm circuit for alarm check purposes. The FIFO status circuit 192 comprises two D-flipflops 540 and 542 which are interconnected in the manner illustrated to determine whether or not the key FIFO buffer 186 has overflowed or is emptied. Both of these conditions constitute an alarm, as previously described.

The frame sync counter 194 may comprise, for example, a 74LS161 counter which is interconnected with a frame sync generator 196 which may comprise a 74165 shift register. The frame sync counter 194 keeps track of the number of characters transmitted in the synchronization sequence. The frame sync generator 196 generates the proper "B" character in sequence.

The data from the keyboard is accumulated serially in the keyboard data register 198 which may comprise, for example, a 74LS164 register. The signals KSTART and KSTOP are applied to the keyboard input select circuitry 200 which comprises an interconnection of inverters and NAND gates. The signals KSTART and KSTOP attach the proper start and stop bits to the key generator priming data PD* which is applied to the register 198 from NAND gates 552 and 554.

Data from the receive line RXDAT may also be selected and accumulated serially in the RX data register 202. The selection of which register 198 or 202 to utilize is made by the register select circuitry 204 which comprises select circuits 556 and 558, which may comprise 74LS157 circuits. The parallel data selected is then routed through to the enciphering circuitry from the selected register in the form of five input data lines labeled ID1-ID5. The signal RDRI generated from register 202 is a synchronized serial data signal representing the received input data. The remaining circuitry shown in FIG. 18 comprises timing and control circuitry 206 which receives the clock signals and control signals in the manner illustrated.

Scrambler II Schematic

Figure 19:
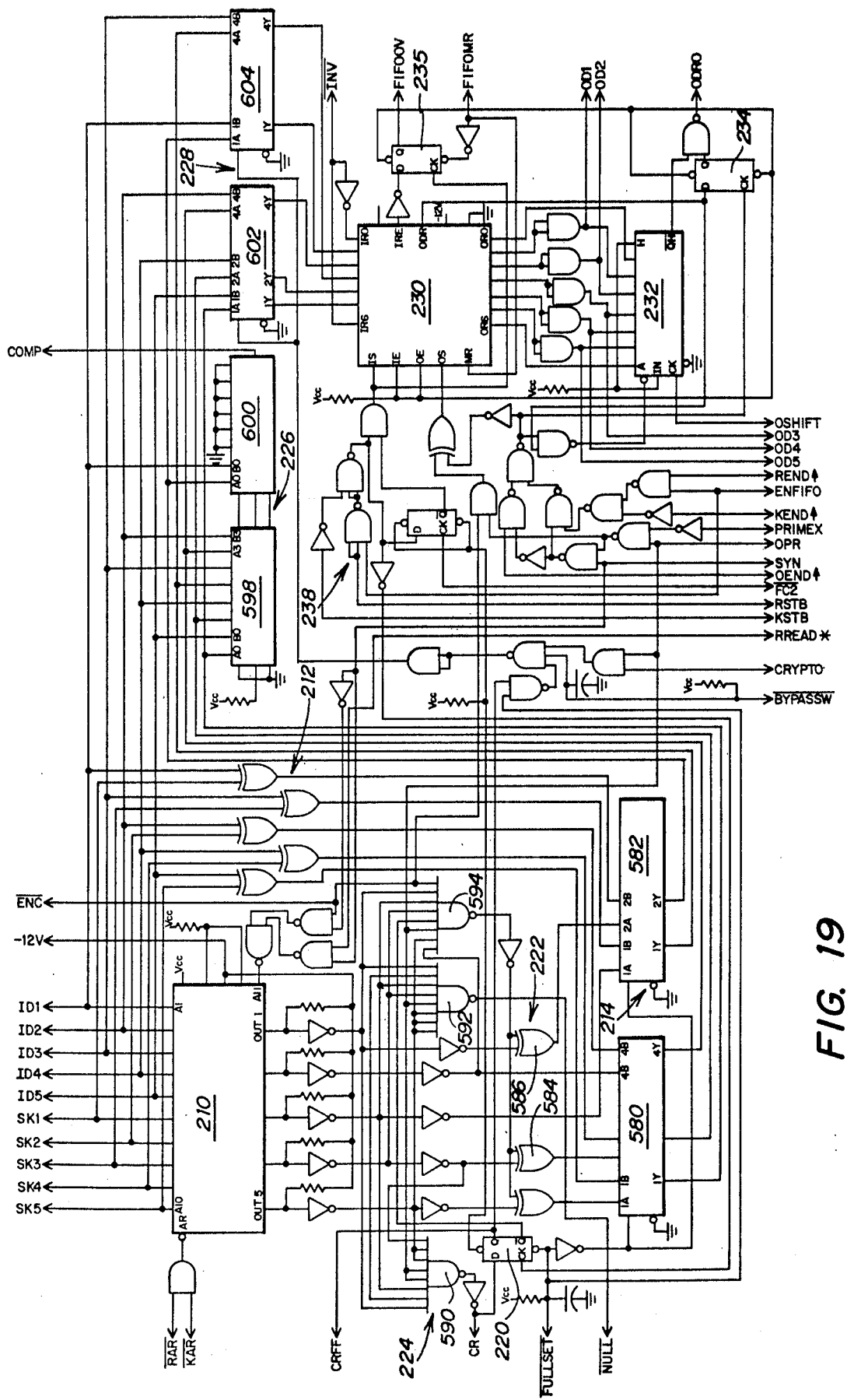
FIG. 19 is a schematic diagram of the Scrambler II circuit of the invention.

FIG. 19 illustrates in schematic detail the Scrambler II circuitry previously shown in block form in FIG. 11. Like numerals are utilized for like and corresponding parts of the two drawings. The enciphering and deciphering circuitry of the invention is included in the Scrambler II circuit. As noted previously, this enciphering consists of read only memory (ROM) 210 and conventional modulo-2 adders 212. The ROM 210 generates a Telex compatable cipher set wherein three forbidden characters are eliminated. The modulo-2 adders 212 provides a full 32 character output, termed a full cipher set.

The operation of the ROM 210 in response to addresses generated by signals ID1-ID5 and SK1-SK5, representative of clear or enciphered text and random key text, has previously been described. Similarly, the operation of the modulo-2 adders 212 in response to plain text or enciphered data and the random key data represented by ID1-ID5 and SK1-SK5 is well known.

The selection of the enciphering circuitry to be utilized is performed by the Full/Telex select circuitry 214 which comprises two select circuits 580 and 582 which may comprise 74LS157 select circuits. The select circuitry 214 is actuated by the set switch located on the power supply module previously described.

When using the ROM 210 for encoding, the output of the ROM 210 must be modified in some instances. Whenever a line feed (LF) character results from a decipher operation, the previous character must be examined to determine whether or not it was a carriage return (CR). If the previous character was not a CR as determined by the circuit CR flipflop 220, the LF-to-FIGS conversion circuitry 222, which comprises exclusive OR gates 584 and 586, converts the LF to a FIGS character. In order to set the CR flipflop 220, a character decode circuit 224 is provided which includes multi-input NAND gate 590, NAND gate 592 and NAND gate 594, which determine whether or not the output of the ROM 210 is a CR, a LF, or a NULL.

The output of the Full/Telex select circuitry 214 is applied to comparators 226 which includes comparators 598 and 600. Comparators 598 and 600 may comprise, for example, 74LS85 comparators. The comparators 598 and 600 compare the enciphered data with the unenciphered input data and the result is signal COMP which is utilized in the alarm circuit.

The plain/crypto select circuitry 228 comprises select circuits 602 and 604, which may comprise 74LS157 selectors. Select circuit 228 selects the unenciphered input data ID1–ID5 or the enciphered data from a Full-/Telex select. The selection depends upon the mode of the system, as previously described. The output of the plain/crypto select circuitry is then applied to the data FIFO buffer 230 which may comprise, for example, a FR1502E buffer.

This buffer is essential in smoothing out the timing differences in the synchronous mode. In the synchronous mode, the data is transmitted under the control of the highly accurate clock. Each character is located precisely within a timing pattern. Since the data from the keyboard is not in synchronization with the transmission line, the data FIFO buffer 230 automatically holds the character from the keyboard until such time as the line is ready for a new character. When the line is ready for a new character, the output of the data FIFO buffer 20 is transferred in parallel to the output data register 232, which may comprise, for example, a 74165 register. The output data register is then shifted serially through the pad flipflop 234 to the data switching circuit in the form of signal ODRO.

If the line is ready for a new character to be transmitted and none is present in the data FIFO buffer 230, the pad flipflop 234 is set to thereby place a "mark hold" on the line equal to one character in length. This allows the keyboard to catch up with the line. The FIFO status flipflop 235 determines whether or not the data FIFO has overflowed to provide an alarm indication. The remaining portion of the circuitry comprises the timing and control circuitry 238 which is responsive to the clock signals and command signals in order to provide timing and control to the various portions of the circuitry illustrated.

Receive Synchronizer Schematic

Figure 20:
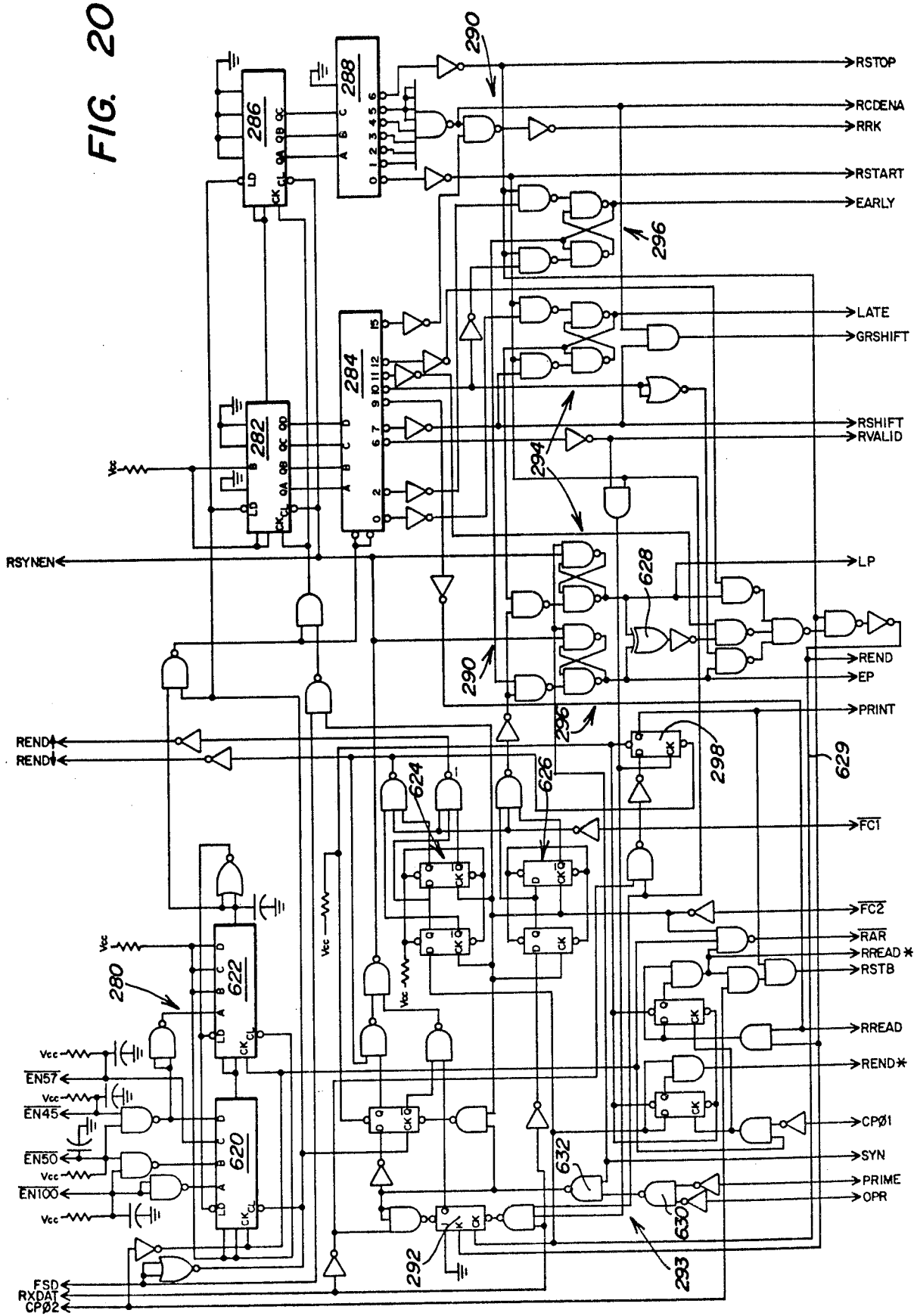
FIG. 20 is a schematic diagram of the receive synchronizer of the invention.

FIG. 20 illustrates in schematic detail the circuitry of the receive synchronizer previously shown in block diagram form in FIG. 12. Like numbers are utilized for like and corresponding circuits in the two figures. As previously noted, the receive synchronizer includes circuitry substantially identical to that of the output and keyboard synchronizers, and thus only the receive synchronizer will be described in schematic detail. The only basic difference between the various synchronizers are the control signals, the driving clocks, and the number of timing signals derived therefrom.

The receive synchronizer shown in FIG. 20 controls the handling of the data from the RX port in either of the on-line modes. In the asynchronous mode, the receive synchronizer operates in start/stop fashion and is activated by the receive data RXDAT. In the SYN HD mode, the synchronizer free-runs as soon as the correlator recognizes the frame sync pattern from the sending unit.

In the slave machine, the receive synchronizer controls the key generator. The receive synchronizer is, however, active in a master unit when the line switch is set to FD. The unit is then expecting a response from the slave unit so that synchronization can be established simultaneously in both directions. In this situation, the receive synchronizer does not control the key generator, but does control the output of the key words stored in the key FIFO register previously identified.

The clock signal labeled CP$\phi$2 is divided by a multimodulus baud rate counter 280 which comprises two counters 620 and 622, such as 74LS161 counters. The amount by which the baud rate counter 280 divides the CP$\phi$2 signal depends upon the baud rate selected from the baud rate switch located on the power supply module. The output of the counter 280 is further divided by a sub-bit counter 282 which is decoded by decoder 284. The counter signal is further divided by the bit counter 286 which is decoded by the decoder 288. Both the decode circuits 284 and 288 are further decoded by the timing pulse decode circuit 290 which may be seen to comprise interconnections of inverters and NAND gates. The output of the timing pulse decode 290 comprises a plurality of timing pulses necessary to operate the system and which have been heretofore described in the various circuitry.

The late flipflop 294 comprises latch connected NAND gates to generate indications of the data and the synchronizer drift. The early flipflop 296 also comprises interconnected latch connected NAND gates to generate early drift of the synchronizer when it is free-running.

Two D-flipflops 626 detect the negative-going edge of the RXDAT incoming data and applies this information to the early flipflop 296 which comprises two pairs of interconnected NAND gate latches. A pair of D-flipflops 626 detect the negative-going edge of the incoming data RXDAT and also applies information to the late flipflop 294 which comprises a pair of interconnected NAND gate latches.

The early flipflop 296 generates the EARLY signal and the EP signal. The late flipflop 294 generates the LATE signal and the LP signal. The EARLY and LATE signals define a timing window. The LP and EP pulses indicate whether or not the incoming pulse occurred within the window, thereby indicating a late or early pulse. The EP and LP pulses are applied to an exclusive OR gate 628 which, in conjunction with suitable decoding logic circuitry, generates an adjusted signal REND when a pulse timing correction is necessary. The pulse REND is applied via lead 629 to the start/stop flipflop 292 in order to correct the timing of the synchronizer. The previously described circuit thus comprises a digital phase lock loop to maintain the receive synchronizer fine tuned to the incoming RXDAT signal.

The print flipflop 298 determines if an incoming character had a start bit in the proper location. If not, the print flipflop 298 is reset and the corresponding character will not be deciphered and applied to the printer. This prevents unwanted characters from being printed which were generated by noise on the line. The free-run logic 293 is responsive to OPR, PRIME and SYN in order to initiate free-running of the synchronizer. The free-run logic comprises inverters and NAND gates 630 and 632.

The start/stop flipflop 292 receives the RXDAT, RSTART and RSTOP signals in order to control the start and stop of the synchronizer in the off-line asynchronous modes. The remainder of the circuit comprises the timing and control circuitry 300 for timing and control of the present system in response to the clocks and command signals previously noted.

Correlator Schematic

Figure 21:
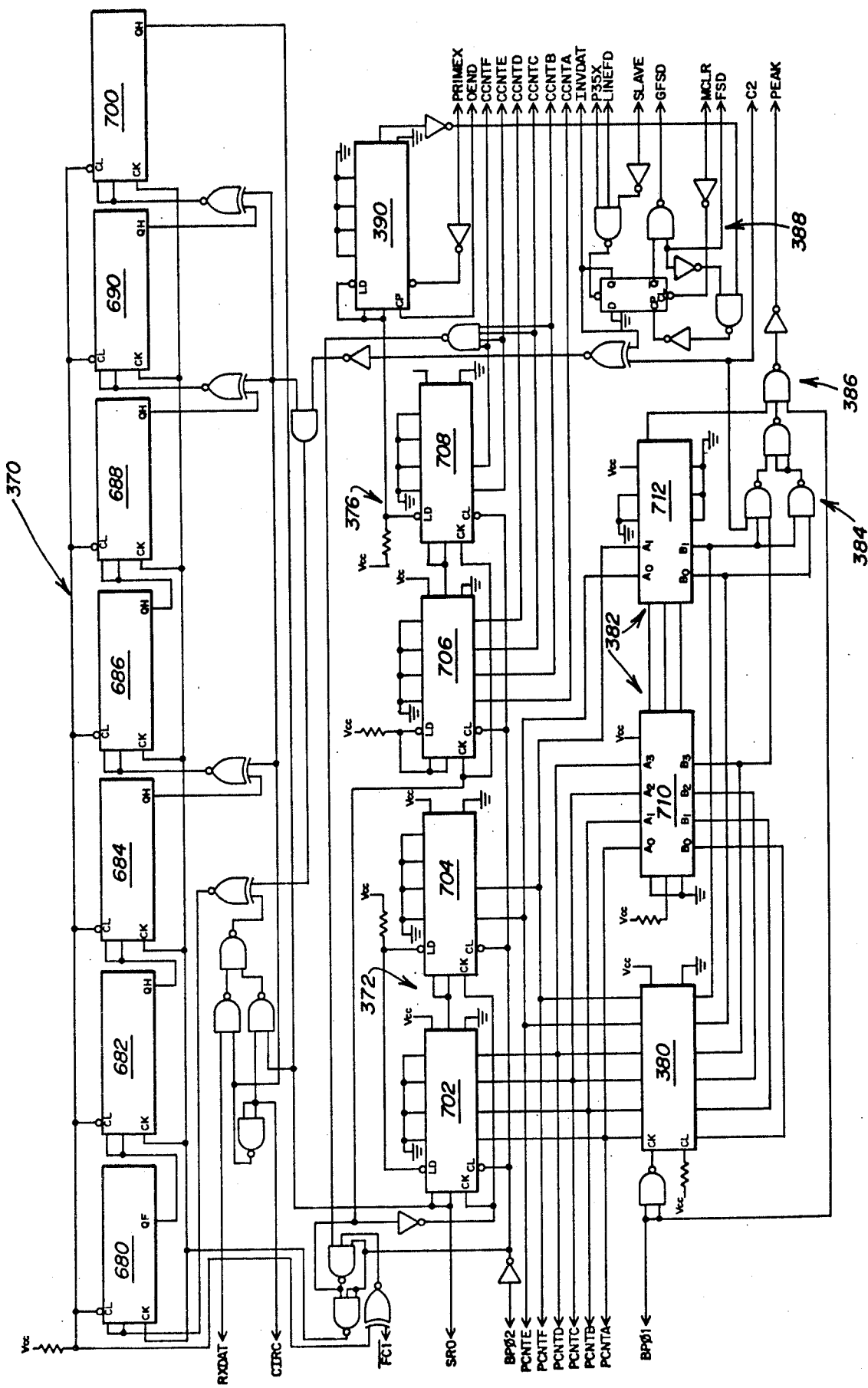
FIG. 21 is a schematic diagram of the correlator circuit of the invention.

FIG. 21 illustrates in schematic detail the correlator circuitry shown in FIG. 15, with like numerals being utilized for like and corresponding parts in the two drawings. As previously noted, the correlation pattern comprises fifteen characters. The frame sync pattern comprises three inverted B's followed by eleven normal character B's, followed by one final inverted B character. Each character in the series is to be recognized by the correlation circuit shown in FIG. 21 and a correlation pulse known as PEAK is then generated.

The first three $\overline{B}$ characters are for preconditioning the correlator to insure that the correlator is in an initial state of C0. If nine out of the following eleven B patterns are detected, the correlator begins looking for the inverse pattern $\overline{B}$. This is accomplished by inverting the input to the correlator register. Once the final $\overline{B}$ pattern has been recognized, the frame sync detect signal FSD will be generated and the system will immediately become the slave unit and start accepting the incoming prime which follows immediately.

The correlation pattern is sampled by sampling the incoming data RXDAT at eight times the bit rate. Each of these samples is accumulated in a 54 bit shift register 370 which comprises seven registers 680–700. If the proper correlation character has occurred, the shift register will contain 54 one's. The number of one's in the shift register 370 is determined by the number of one's counter 372 which comprises counters 702 and 704. The shift registers 680–700 may comprise, for example, 74LS164 registers, while the counter 372 may comprise 74LS161 counters.

As previously noted, the shift register 370 may be configured to act as an end around shift register by the control signal CIRC, thereby circulating the contents of the shift register 370. If the signal CIRC is a logical "0", the shift register 370 is configured to accept a new sample. After each sample, the shift register 370 configures itself as a circulating shift register and is clocked 54 times to complete one revolution of the contents thereof. As the contents of the register 370 are circulated, the number of one's contained in the register 370 is accumulated in the number of one's counter 372.

The shift/clock counter 376 comprises 74LS161 counters 706 and 708. Counter 376 controls the shifting of the correlator register 370. After each circulation of the register 370, the contents of the number of one's counter 372 is transferred in parallel to the holding register 380. The output of the holding register, as well as the output of the number of one's counter 372, is fed to a comparator 382 which comprises comparators 710 and 712. Comparators 710 and 712 may comprise, for example, 74LS85 comparators. The output of the comparator 382 is applied through a threshold detector 384 and to a peak detector 386 in order to generate the PEAK signal.

Inversion control is also provided in the circuitry to invert the input to the correlator register 370. In this particular mode of operation, the master unit is expecting a response from the slave unit. The response from the slave is exactly inverse from that of a normal frame sync detect pattern. For this reason, when the master unit is initiating its frame sync pattern, the inversion control 388 instructs the correlator to look for an inverse pattern from the slave. If the inverse pattern from the slave has not occurred within a specified interval of time (approximately eight characters in duration), the time out counter 390 restores the correlator back to its normal mode of operation.

It will thus be seen that the present invention comprises an automatic digital encryption system which is operable in any of a plurality of different modes. The present system is thus provided with an unusual amount of flexibility, while providing a high degree of security for transmitted digital data.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. Prime circuitry for a digital cipher system comprising:
   a key generator for generating a priming sequence composed of a plurality of random digital prime bits,
   a storage circuit,
   means for transmitting said priming sequence to a remote cipher unit and simultaneously to said storage circuit,
   means for accessing said storage circuit for repetitively transmitting said priming sequence to the remote cipher unit so that said priming sequence is transmitted a predetermined number of times, and
   said remote cipher unit including receiving means for building a single received sequence with each bit of said received sequence being determined by the corresponding bits of each of said priming sequences.

2. The prime circuitry of claim 1 wherein said storage circuit comprises a random access memory.

3. The prime circuitry of claim 1 wherein said priming sequence is transmitted at least five times.

4. The prime circuitry of claim 1 wherein said priming sequence comprises five binary characters.

5. The prime circuitry of claim 1 wherein all of said plurality of random digital prime bits are transmitted in their entirety during each of the repeated prime transmissions.

6. The prime circuitry of claim 1 wherein said means for accessing further comprises:
   a prime repeat counter for counting the number of repetitive transmissions of said priming sequence, and
   a transmit prime control for limiting the number of transmissions of said prime sequence to a predetermined number.

7. The prime circuitry of claim 1 wherein said receiving means comprises:
   a remote storage circuit of said remote cipher unit for receiving and storing the predetermined number of said priming sequences,
   an address scan circuit for accessing corresponding bits of each of the predetermined number of said priming sequences stored in said remote storage circuit and for producing groups of corresponding bits,
   a voting unit for selecting a logic level in response to each group of corresponding bits, and
   a prime control for producing the received sequence in response to the logic level selected by said voting unit.

8. The prime circuitry of claim 7 wherein said voting unit selects the logic levels corresponding to the logic level of the greatest number of said corresponding bits in each group of corresponding bits.

* * * * *

UNITED STATES PATENT AND TRADEMARK OFFICE
CERTIFICATE OF CORRECTION

PATENT NO. : 4,166,922

DATED : September 4, 1979

INVENTOR(S) : Frederick A. Kinch and Barrie O. Morgan

It is certified that error appears in the above-identified patent and that said Letters Patent are hereby corrected as shown below:

Col. 9, line 24, "and" should be --any--.

Col. 10, line 14, "communication" should be --communications--.

Col. 12, line 47, before "Universal", insert --the--.

Col. 17, line 26, "QQ denotes sequence LTRSQQ detected" should be in brackets.

Col. 19, line 7, "ENCLP" should be --$\overline{\text{ENCLP}}$--;

line 59, "operation" should be --operations--.

Col. 25, line 52, "200" should be --220--.

Col. 26, line 15, "2300" should be --230--;

line 18, "flip-flop" should be --flipflop--.

Col. 27-28, lines 3-5 (TABLE I), "Key↓" should be --Key↓--
　　　　　　　　　　　　　　　　　　　　→

"Data" should be --Data--
　T　　　　　　　　　　O

"Null" should be --Null--
　Z　　　　　　　　　　T

UNITED STATES PATENT AND TRADEMARK OFFICE
CERTIFICATE OF CORRECTION

PATENT NO. : 4,166,922
DATED : September 4, 1979
INVENTOR(S) : Frederick A. Kinch, Jr. and Barrie O. Morgan It is certified that error appears in the above-identified patent and that said Letters Patent are hereby corrected as shown below:

TABLE I (continued)

"E" should be --E--
L                Z

"LF" should be --LF--
W              L

"A" should be --A--
H              W

"SP" should be --SP--
Y              H

"S" should be --S--
P              Y

"I" should be --I--
Q              P

"U" should be --U--
O              Q

UNITED STATES PATENT AND TRADEMARK OFFICE
CERTIFICATE OF CORRECTION

PATENT NO. : 4,166,922

DATED : September 4, 1979

INVENTOR(S) : Frederick A. Kinch, Jr. and Barrie O. Morgan

It is certified that error appears in the above-identified patent and that said Letters Patent are hereby corrected as shown below:

TABLE I (continued)

"CR" should be --CR--
 B            O

"D" should be --D--
 G            B

"R" should be --R--
FIGS          G

"J" shoudl be --J--
 M           FIGS

"N" should be --N--
 X            M

"F" should be --F--
 V            X

"C" should be --C--
LTRS          V

"K" should be --K--
             LTRS

UNITED STATES PATENT AND TRADEMARK OFFICE
CERTIFICATE OF CORRECTION

PATENT NO. : 4,166,922

DATED : September 4, 1979

INVENTOR(S) : Frederick A. Kinch, Jr. and Barrie O. Morgan

It is certified that error appears in the above-identified patent and that said Letters Patent are hereby corrected as shown below:

Col. 27-28, TABLE II,   "Key↓" should be --Key↓--
                        →

"Data" should be --Data--
                                          T                    O "Null" should be --Null--
                                        Z                     T "E" should be --E--
                                        L                  Z "LF" should be --LF--
                                      W                  L "A" should be --A--
                                      H                  W "SP" should be --SP--
                                      Y                  H

UNITED STATES PATENT AND TRADEMARK OFFICE
CERTIFICATE OF CORRECTION

PATENT NO.  : 4,166,922

DATED       : September 4, 1979

INVENTOR(S) : Frederick A. Kinch, Jr. and Barrie O. Morgan

It is certified that error appears in the above-identified patent and that said Letters Patent are hereby corrected as shown below:

TABLE II (continued)

"S" should be --S--
P            Y

"I" should be --I--
Q            P

"U" should be --U--
O            Q

"CR" should be --CR--
B              O

"D" should be --D--
G            B

"R" should be --R--
FIGS         G

"J" should be --J--
M            FIGS

UNITED STATES PATENT AND TRADEMARK OFFICE
CERTIFICATE OF CORRECTION

PATENT NO. : 4,166,922
DATED : September 4, 1979
INVENTOR(S) : Frederick A. Kinch, Jr. and Barrio O. Morgan It is certified that error appears in the above-identified patent and that said Letters Patent are hereby corrected as shown below:

TABLE II (continued)

```
"N"  should be  --N--
 X               M

"F"  should be  --F--
 V               X

"C"  should be  --C--
LTRS             V

"K"  should be  --K--
                LTRS
```

Col. 29, line 24, "before" should be --before,--
       line 61, "Likewise" should begin new paragraph.
Col. 30, line 18, "IDDLE" should be --IDLE--'
       line 30, "state" should be --state,--.
Col. 31, line 38, "online" should be --on-line--.
Col. 32, line 25, "phase-lock loop" should be --phase-lock-loop--;
       line 37, "eing" should be --being--.

UNITED STATES PATENT AND TRADEMARK OFFICE
CERTIFICATE OF CORRECTION

PATENT NO. : 4,166,922
DATED : September 4, 1979
INVENTOR(S) : Frederick A. Kinch, Jr. and Barrie O. Morgan It is certified that error appears in the above-identified patent and that said Letters Patent are hereby corrected as shown below:

Col. 34, line 50, "(B)" should be --($\bar{B}$)--.

Col. 37, line 39, "The" should be --A--.

Col. 38, line 37, "bust" should be --burst--;

line 64, "FC2" should be --$\overline{FC2}$--.

Col. 41, line 18, "20" should be --230--;

line 66, "multimodulus" should be --multi-modulus--.

Col. 43, line 9, ""B" should be --$\bar{B}$--.

Signed and Sealed this

Eighth Day of January 1980

[SEAL]

Attest:

SIDNEY A. DIAMOND

Attesting Officer      Commissioner of Patents and Trademarks